(12) United States Patent
Hilsgen et al.

(10) Patent No.: US 9,259,849 B2
(45) Date of Patent: Feb. 16, 2016

(54) VEHICLE-MOUNTED HYDRAULIC SLAB CUTTER

(75) Inventors: Troy Hilsgen, Kimball, MN (US); Christopher W. Lougheed, Litchfield, MN (US)

(73) Assignee: Clark Equipment Company, West Fargo, ND (US)

(*) Notice: Subject to any disclaimer, the term of this patent is extended or adjusted under 35 U.S.C. 154(b) by 726 days.

(21) Appl. No.: 13/097,958

(22) Filed: Apr. 29, 2011

(65) Prior Publication Data
US 2011/0203565 A1  Aug. 25, 2011

Related U.S. Application Data

(63) Continuation-in-part of application No. 11/805,838, filed on May 24, 2007, now abandoned.

(51) Int. Cl.
| | |
|---|---|
| B28D 1/04 | (2006.01) |
| E01C 23/088 | (2006.01) |
| B23D 45/02 | (2006.01) |
| B27B 5/10 | (2006.01) |

(Continued)

(52) U.S. Cl.
CPC ............... B27B 5/10 (2013.01); B23D 45/027 (2013.01); B23D 59/001 (2013.01); B28D 1/044 (2013.01); B28D 1/045 (2013.01); E01C 23/0933 (2013.01)

(58) Field of Classification Search
CPC ........ B23D 45/02; B23D 45/027; B28D 1/04; B28D 1/042; B28D 1/044; B28D 1/045; E01C 23/088; E01C 23/0933
USPC .......... 125/13.01, 13.03; 299/39.1, 39.3, 39.6
See application file for complete search history.

(56) References Cited

U.S. PATENT DOCUMENTS 3,378,307 A    4/1968  Dempsey et al.
3,649,071 A *  3/1972  Graff ........................ 299/41.1
(Continued)

FOREIGN PATENT DOCUMENTS

CA    1253420 A1    5/1989
EP    0283286 A2    9/1988
(Continued)

OTHER PUBLICATIONS

Search Report and Written Opinion issued Dec. 6, 2012 for International Application No. PCT/US2012/034938, filed Apr. 25, 2012, 18 pages.

(Continued)

*Primary Examiner* — Eileen Morgan
(74) *Attorney, Agent, or Firm* — John D. Veldhuis-Kroeze; Westman, Champlin & Koehler, P.A.

(57) ABSTRACT

A cutting implement configured to be attached to an implement carrier of a power machine. The cutting implement includes an attachment structure that is capable of engaging and being secured to the implement carrier. The cutting implement further includes a boom having a distal end and a proximal end. The proximal end is attached to the attachment structure. A trolley is selectively positionable between the proximal end and the distal end of the boom. An undercarriage is operably coupled to the trolley and has a cutting element attached to it. The undercarriage is moveable under power in a lateral direction with respect to the trolley so that the cutting element is capable of being offset along a lateral direction with respect to the boom.

19 Claims, 13 Drawing Sheets

(51) Int. Cl.
*B23D 59/00* (2006.01)
*E01C 23/09* (2006.01)

(56) References Cited

U.S. PATENT DOCUMENTS

| | | | | |
|---|---|---|---|---|
| 3,779,609 | A | | 12/1973 | James |
| 3,785,705 | A | | 1/1974 | Binger et al. |
| 4,054,179 | A | | 10/1977 | Destree |
| 4,134,459 | A | | 1/1979 | Hotchen |
| 4,236,356 | A | | 12/1980 | Ward |
| 4,310,198 | A | | 1/1982 | Destree |
| 4,353,275 | A | | 10/1982 | Colville |
| 4,433,871 | A | * | 2/1984 | Bertrand ............ 299/41.1 |
| 4,557,245 | A | | 12/1985 | Bieri |
| 4,762,371 | A | * | 8/1988 | Lupton ............ 299/39.8 |
| 4,832,412 | A | | 5/1989 | Bertrand |
| 5,135,287 | A | * | 8/1992 | Karnes ............ 299/39.3 |
| 5,215,071 | A | | 6/1993 | Mertes et al. |
| 5,676,125 | A | * | 10/1997 | Kelly et al. ............ 125/13.03 |
| 5,724,956 | A | | 3/1998 | Ketterhagen |
| 5,803,071 | A | | 9/1998 | Chiuminatta et al. |
| 6,203,112 | B1 | | 3/2001 | Cook et al. |
| 6,286,905 | B1 | * | 9/2001 | Kimura et al. ............ 299/39.3 |
| 6,293,269 | B1 | | 9/2001 | Selb et al. |
| 6,422,228 | B1 | | 7/2002 | Latham |
| 6,863,062 | B2 | | 3/2005 | Denys |
| 6,907,874 | B1 | | 6/2005 | Faircloth |
| 2004/0007226 | A1 | * | 1/2004 | Denys ............ 125/13.01 |
| 2006/0210385 | A1 | | 9/2006 | Cook |
| 2006/0289180 | A1 | | 12/2006 | Wentling |
| 2007/0194617 | A1 | | 8/2007 | Moller et al. |
| 2008/0017182 | A1 | * | 1/2008 | Hilsgen ............ 125/13.01 |

FOREIGN PATENT DOCUMENTS

| | | |
|---|---|---|
| FR | 1590110 A | 5/1970 |
| WO | 03025289 A1 | 3/2003 |
| WO | 2007145880 A2 | 12/2007 |

OTHER PUBLICATIONS

Communication from the Chinese Patent Office dated May 12, 2011 for Chinese application No. 200780028683.X, filed Jun. 4, 2007.
Search Report and Written Opinion dated Sep. 15, 2008 for International application No. PCT/US2007/013112, filed Jun. 4, 2007.
Coneqtec universal, Slot Cutter SSG Series Brochure; 2 pages; www.coneqtecuniversal.com; available at http://www.coneqtecuniversal.com/pdf/slotcutterspecs.pdf.
Attachment International Inc.; Speciality Attachments; 3 pages; http://www.attachmentsintl.com/skidsteer/specialityattach/mrspecattach/mrspecattach.htm.
Terra Power Attachments, S9 Pavement Saw Description; © 2004/ Terra Power Attachments, Inc.; http:..www.terrapwr.com/pavementsaw.htm.
Edge Hydraulic Hand Tools—Cut-Off Saw—ECS14 Product Specification Sheet; ceattachmentsinc.

* cited by examiner

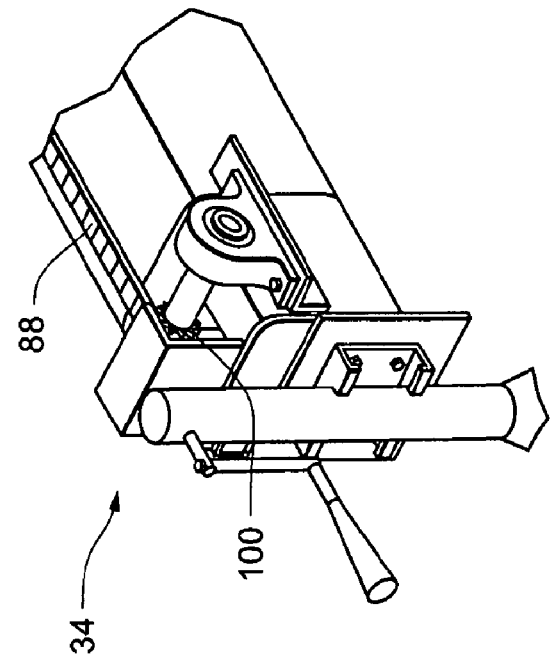
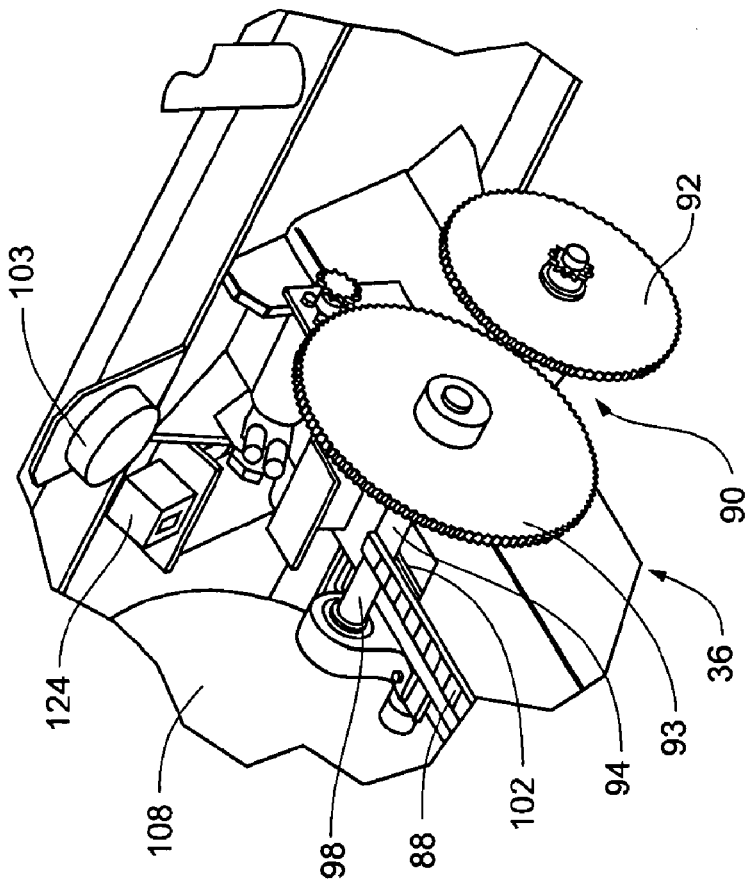

VEHICLE-MOUNTED HYDRAULIC SLAB CUTTER

RELATED APPLICATION

The present application claims the benefit of U.S. Provisional Application No. 60/810,375, filed Jun. 2, 2006, which is incorporated herein in its entirety by reference. The present application is also a continuation-in-part of U.S. patent application Ser. No. 11/805,838.

BACKGROUND

The present invention relates to slab cutters. More particularly, the present invention relates to a hydraulically controlled apparatus that can be mounted onto a skid-steer loader for cutting paved surfaces.

Paved surfaces such as streets, curbs, sidewalks, and driveways generally must be made from highly durable materials that are able to withstand heavy and frequent traffic. Materials such as concrete, asphalt, masonry, and stonework are well-suited for such applications because of their relatively high hardness. For a variety of reasons, it is often necessary to cut these materials after they have been set into place. In such situations, the relative hardness of the materials from which the surfaces are made and other factors can significantly increase the difficulty of effecting cuts.

A common situation in which a surface requires cutting is when concrete has been poured and begins to cure. As concrete cures, it typically contracts approximately one-sixteenth of an inch for every ten feet of concrete poured. This contraction can cause irregular cracking that will diminish the performance, longevity, and aesthetic appeal of the surface. When concrete is used in forming relatively large slabs, such as sidewalks or streets, cracking is a virtual certainty.

The cracking that occurs once concrete is poured can, however, be controlled by cutting grooves, or control joints, into the concrete at regular or semi-regular intervals before the concrete completely cures. Generally, these control joints act as pre-weakened stress points that encourage the concrete to crack along the control joints during the curing process. As a result, cracking that occurs can be contained to grooves of regularly spaced control joints.

Concrete, as well as other materials used to form paved surfaces, may also require cutting for other purposes. Road repair, for example, often requires discrete segments or areas of a paved surface to be removed or replaced. Similarly, utilities buried under roadways typically cannot be repaired or replaced unless portions of the roadway are first removed. In other instances, demolition, construction, or reconfiguration of paved surfaces such as parking lots, patios, streets, and sidewalks require that portions or segments of these surfaces be removed.

SUMMARY

In one embodiment, a cutting implement configured to be attached to an implement carrier of a power machine is disclosed. The cutting implement includes an attachment structure that is capable of engaging and being secured to the implement carrier. The cutting implement further includes a boom having a distal end and a proximal end. The proximal end is attached to the attachment structure. A trolley is capable of being selectively positioned between the proximal end and the distal end of the boom. An undercarriage is operably coupled to the trolley and has a cutting element attached to it. The undercarriage is moveable under power in a lateral direction with respect to the trolley so that the cutting element is capable of being offset along a lateral direction with respect to the boom.

In another embodiment, a method of cutting a pavement material is disclosed. The method includes attaching a cutting implement to a power machine. The cutting implement has a boom that extends generally distally from the power machine and a trolley capable of moving along the boom under power. The power machine has a plurality of actuable operator inputs in electrical communication with an electronic controller. The method further includes actuating at least one of the operator inputs to cause an undercarriage attached to the trolley and having a cutting element coupled thereto to move in a lateral direction with respect to the trolley.

In yet another embodiment, a method of providing a fluid to a cutting element on a cutting implement that is attachable to a power machine is disclosed. The method includes providing a communication link capable of receiving an indication of an intention to provide the fluid according to one of a plurality of available modes.

BRIEF DESCRIPTION OF THE DRAWINGS

FIG. 10 is a perspective view showing a gear reduction mechanism illustrated in FIG. 9 in more detail.

FIG. 11 is a perspective view showing a portion of distal end of a boom of the cutting implement of FIG. 1 in more detail.

DETAILED DESCRIPTION

Concepts are disclosed herein via discussion of exemplary embodiments referenced in the FIGS. and the following description. While these disclosed concepts are not limited to their application in embodiments discussed herein, these concepts will be better appreciated through a discussion of exemplary embodiments.

Figure 1:
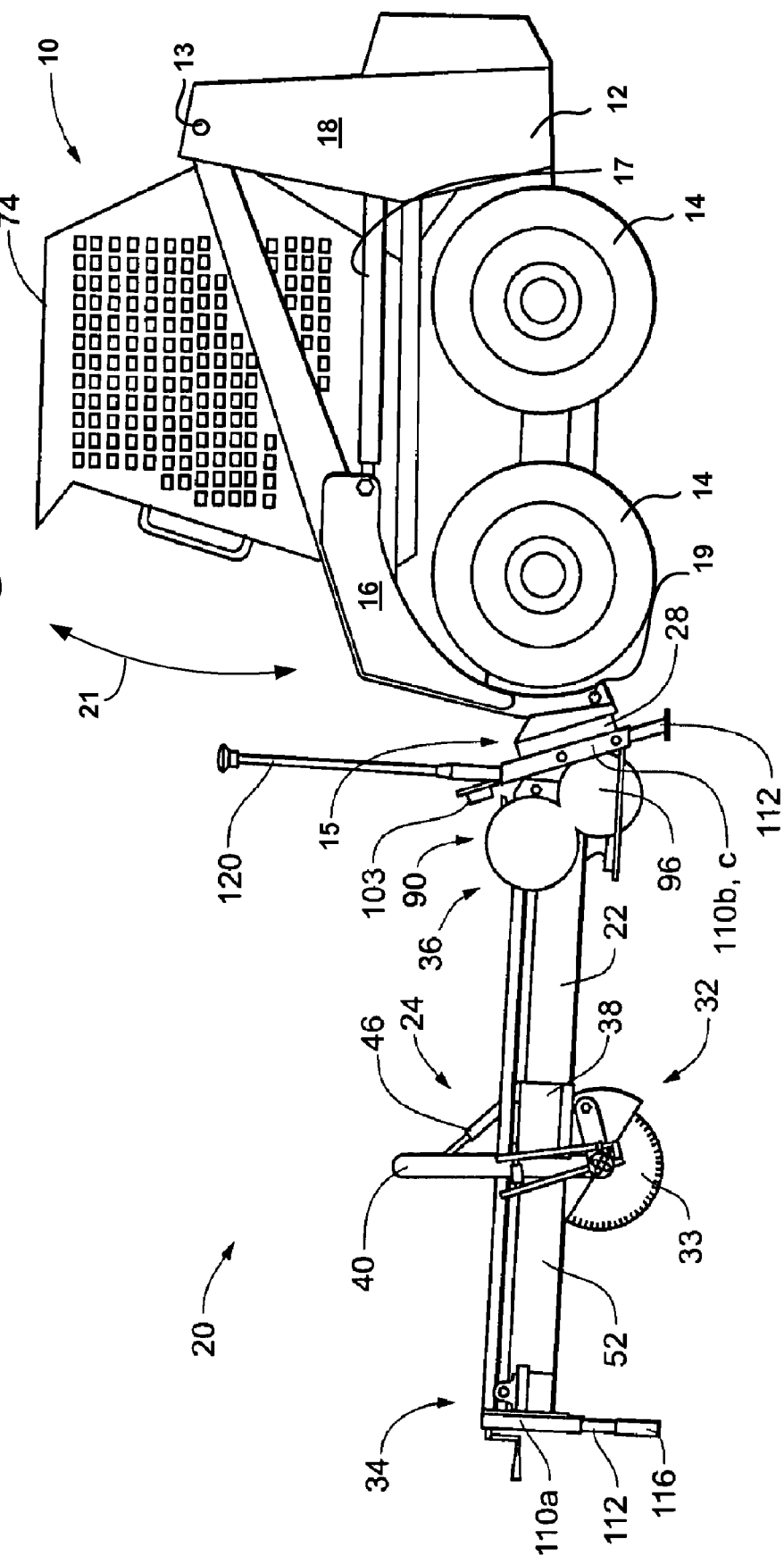
FIG. 1 is a side view of a cutting implement including a rotary saw coupled to a power machine according to one illustrative embodiment of the present disclosure.

FIG. 1 illustrates a cutting implement 20 coupled to a power machine 10 according to one embodiment. Power machine 10 is a skid steer loader, but other power machines such as tracked loaders, all-wheel steer vehicles, utility vehicles, excavators, to name a few, are capable of interfacing with and operating an implement such as cutting implement 20. The power machine 10 shown in FIG. 1 includes a frame 12, supported by a plurality of tractive devices, in this case, wheels 14. In other embodiments, the tractive devices are track assemblies. A pair of lift arms 16 (only one of which is shown in FIG. 1) are rotatably coupled to a pair of upright members 18 of the frame 12 (only one of which is shown in FIG. 1) at pivot points 13 at a distal end of the lift arms. An implement carrier 15 is rotatably coupled to a proximal end of the lift arms at pivot points 19. One or more tilt actuators (not shown) are pivotally coupled to the lift arms 16 or a cross member (not shown) that extends there between. The one or more tilt actuators are capable of rotating the implement carrier 15 with respect to the lift arms 16. The implement carrier 15 is capable of being secured to, and carrying, any number of different implements, including the cutting implement 20, as shown in FIG. 1.

The lift arms 16 are also coupled to a pair of actuators 17, which are capable of pivoting the lift arms 16 about pivot points 13. Actuators 17 are also coupled to the frame 12 of the power machine 10. Actuation of the actuators 17 causes the lift arms 16 to raise and lower such that the proximal end of the lift arms travel in a generally radial path represented by arrow 21. It should be appreciated that other configurations of lift arms and frames are contemplated. For example, some lift arm configurations can be raised and lowered such that the proximal end of the lift arms travel in a generally vertical path.

The actuators 17 that move the lift arms 16 and the one or more tilt actuators are, in one embodiment, linear hydraulic actuators that extend and retract when hydraulic fluid is introduced into one or the other end of the actuator. Power machine 10 illustratively includes an engine that is operably coupled to a hydraulic power supply (not shown) that is in turn coupled to the actuators to provide power to extend and retract them. The hydraulic power supply can also provide hydraulic fluid to implements that are coupled to the power machine, such as cutting implement 20 to control functions thereon. Power machine 10 has a plurality of actuable operator input devices (not shown) such as switches, sliders, rotary devices including variable output devices, and buttons that are operable to provide indications from an operator of the power machine 10 as to the desired control of the flow of hydraulic fluid to the actuators and any implement that may be coupled to the power machine.

Referring to FIGS. 1-4, cutting implement 20 includes a boom 22 and trolley 24 that carries a rotary cutting element, such as a saw 32 in an exemplary embodiment. The saw blade is but one type of cutting element that can be used with embodiments of the present disclosure. Other cutting elements include drums or wheels with various types of cutting or grinding members capable of cutting and/or grinding various materials. Cutting implement 20 also includes an attachment plate 28 that is configured to be secured to the implement carrier 15 of power machine 10 and is shown in the secured position in FIG. 1. Boom 22 is, in one embodiment, fixedly secured on a proximal end 36 to the attachment plate 28 such as by welding and extends linearly toward a distal end 34 so that the boom is a generally perpendicular with respect to the attachment plate 28. Cutting implement 20 is capable of cutting a paved surface, such as, for example, a concrete sidewalk, roadway, or another similar surface, as trolley 24, carrying a rotary cutting element such as saw 32, is powered to move along boom 22 from distal end 34 to proximal end 36 in response to an indication of an operator input, as will be discussed in more detail below.

To support the weight of trolley 24 and the saw 32, maintain a consistent shape through repeated use, and resist fatigue, boom 22 should be made of a substantially rigid material. In an exemplary embodiment, boom 22 is made of steel.

The material from which boom 22 is made may be formed into any number of shapes to facilitate travel of and support trolley 24. In an exemplary embodiment, boom 22 has a substantially square cross section, depicted in FIGS. 1-4. In other embodiments, boom 22 is constructed such that a cross section of boom 22 forms other geometric configurations such as, for example, a circle, a triangle, a rectangle, or an I-shape.

Figure 2:
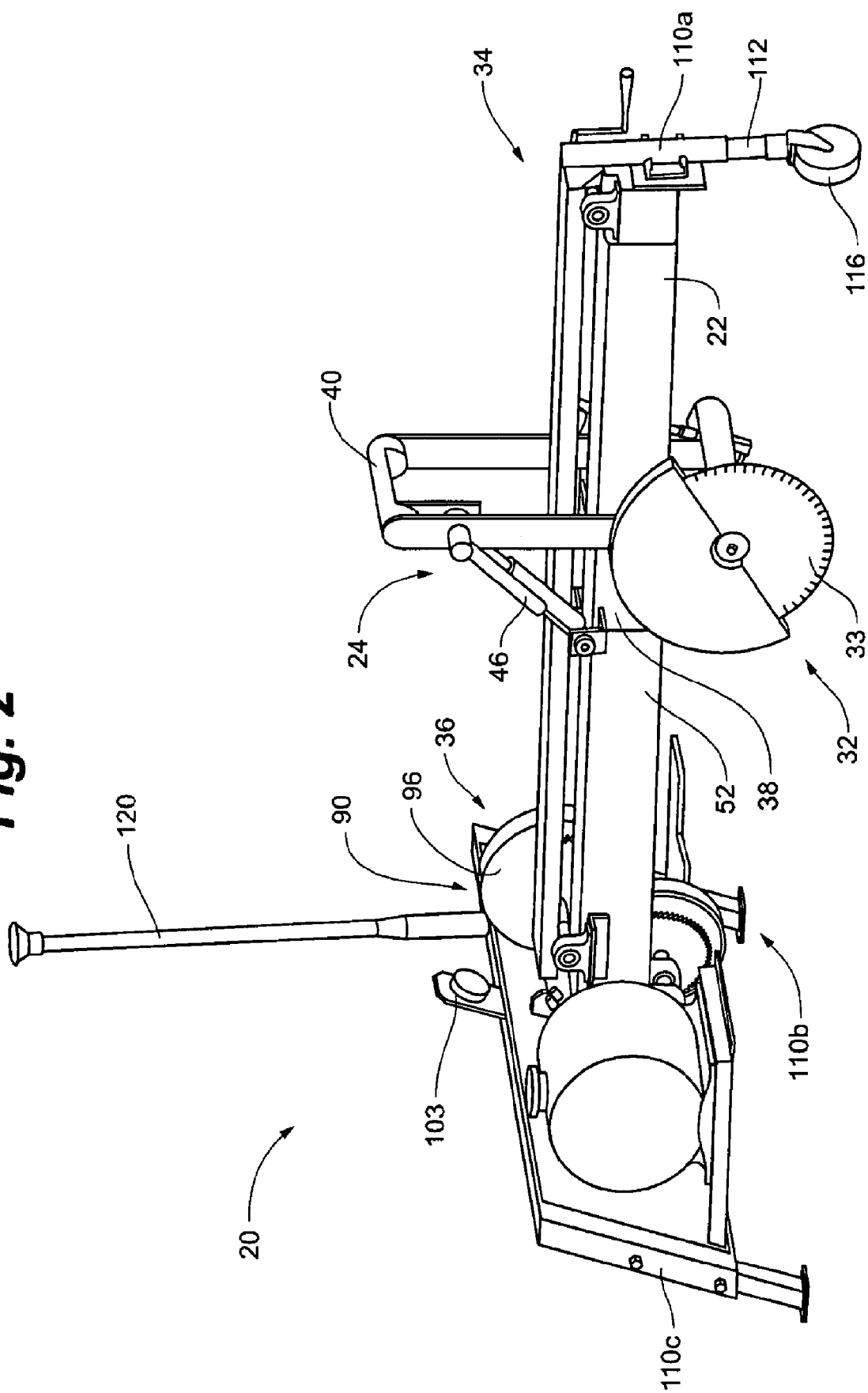
FIG. 2 is a perspective view of the cutting implement of FIG. 1.
Figure 9:
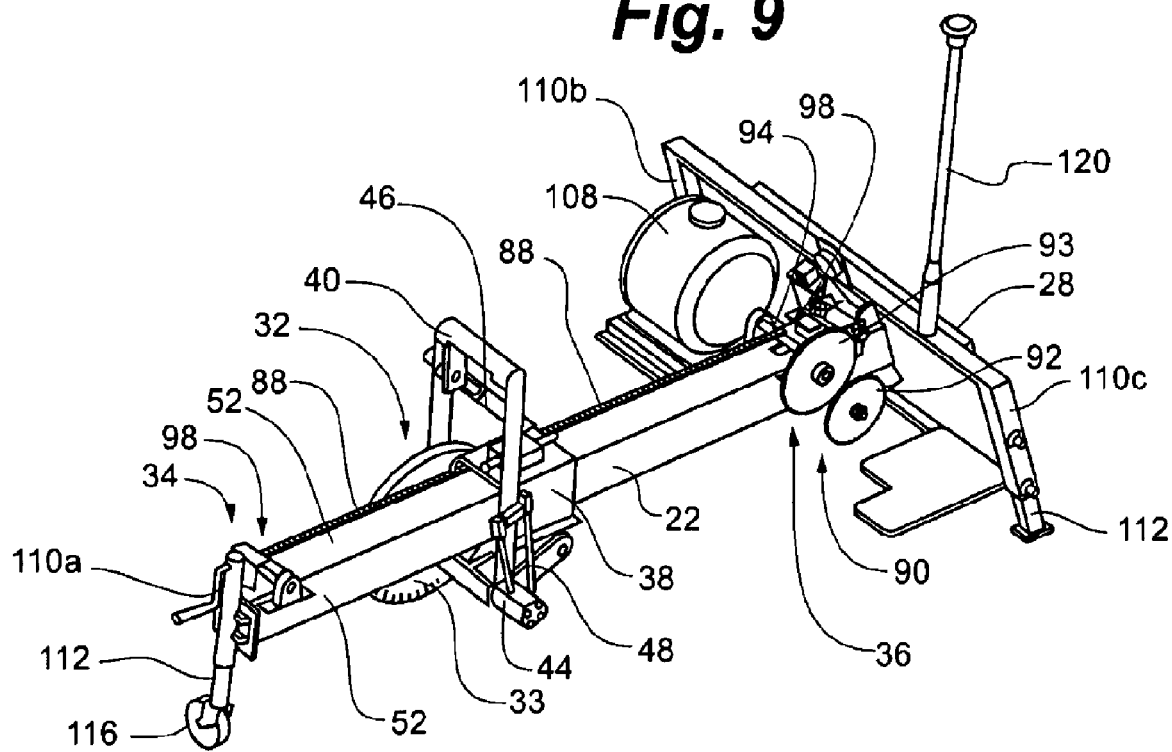
FIG. 9 is a perspective view of a cutting implement having a rotary saw according to an illustrative embodiment in which a gear reduction is accomplished by first and second reduction gears.

Boom 22 may include several features or components that enhance the performance of cutting implement 20. For example, the ability of cutting implement 20 to effect straight cuts at a uniform depth in a paved surface can be increased by stabilizing distal end 34 of boom 22. By limiting horizontal and vertical movement of cutting implement 20 during operation, an operator can achieve straighter cuts at a more uniform depth, thereby optimizing operation of cutting implement 20. To stabilize boom 22 when boom 22 is lowered into a cutting position, cutting implement 20 may be equipped with jack stand 110. Referring to FIGS. 1-4 and 9, cutting implement 20 may have front jack stand 110a located near distal end 34 of boom 22 and rear jacks stands 110b,c located near proximal end 36 of boom 22. Generally, jack stands 110 have extendable member 112 that be raised or lowered so that foot 114 rests on the ground or other surface. Front jack stand 110a may also have wheel 116, as depicted in FIGS. 1-2 and 9.

Jack stands can be manually operated, hydraulically operated, or operated through a combination thereof. Referring to FIG. 2, front jack stand 110a is manually operated and rear jack stands 110b,c are hydraulically operated. In another embodiment, front jack stand 110a is hydraulically operated and rear jack stands 110b,c are manually operated. In another embodiment, front jack stand 110a and rear jack stands 110b,c are both manually operated. In another embodiment, front jack stand 110a and rear jack stands 110b,c are both hydraulically operated. In embodiments in which jack stands 110 are manually operated, jack stands 110 can be operated by, for example, rotating a lever that actuates a lift mechanism. In embodiments in which jack stands 110 are hydraulically operated, jack stands 110 can be operated by, for example, manipulating a control mechanism mounted in cab 74 of power machine 10. In other embodiments in which jack stands 110 are hydraulically operated, cutting implement 20 may include a self-leveling system for adjusting the height of jack stands 110 relative to the surface being cut.

The ability to adjust the height of jack stands 110 allows cutting implement 20 to be easily adapted to rest on support surfaces having different levels relative to the level of the paving surface being cut. For example, curing concrete being cut for control joints in a sidewalk may present a support surface adjacent to the sidewalk that is not yet back-filled. Cured concrete being cut for sidewalk removal purposes, however, may a present an adjacent support surface that has already been backfilled. To create linear cuts at a uniform depth, cutting implement 20 should have an ability to be variably stabilized on the different levels of the various support surfaces relative to the sidewalk. In an exemplary embodiment, cutting implement 20 has front jack stand 110a located at distal end 34 of boom 22 and two rear jack stands 110b, c located on opposite ends of attachment plate 28 at proximal end of boom 36. In other embodiments, cutting implement 20 only has front jack stand 110a located at distal end 34 of boom 22.

Although the embodiments of cutting implement 20 described above have boom 22 extending outward from power machine 10, other embodiments may include boom 22 oriented in a different direction. For example, cutting implement 20 can be configured so that boom 22 is oriented transverse to the fore-aft axis of power machine 10, or, in other words, substantially transverse with a side of power machine 10. Such a configuration permits an operator to maneuver power machine 10 parallel to a paved surface while making cuts in the paved surface at a desired interval. Alternatively, boom 22 can be attached to power machine 10 such that boom 22 is able to pivot between a transverse orientation and an extended orientation.

Figure 5:
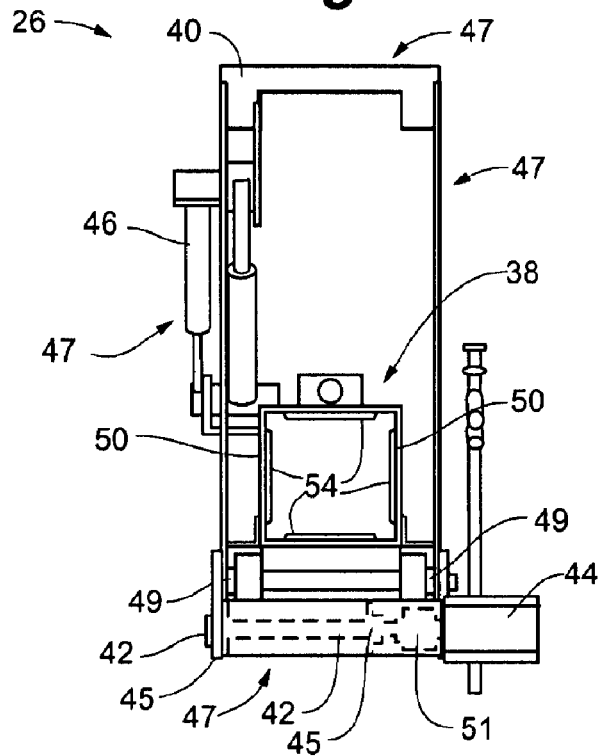
FIG. 5 is a front view of a trolley that is capable of moving along a boom of the cutting implement of FIG. 1 according to one illustrative embodiment.
Figure 6:
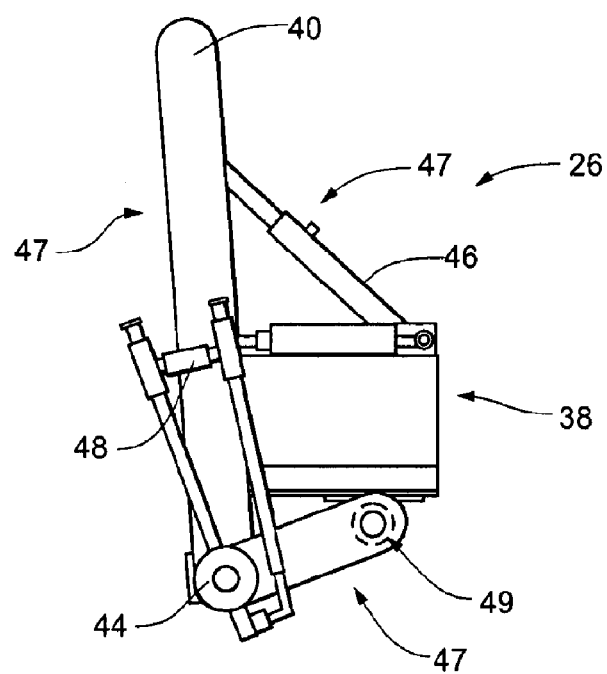
FIG. 6 is a side view of the trolley of FIG. 5.
Figure 7:
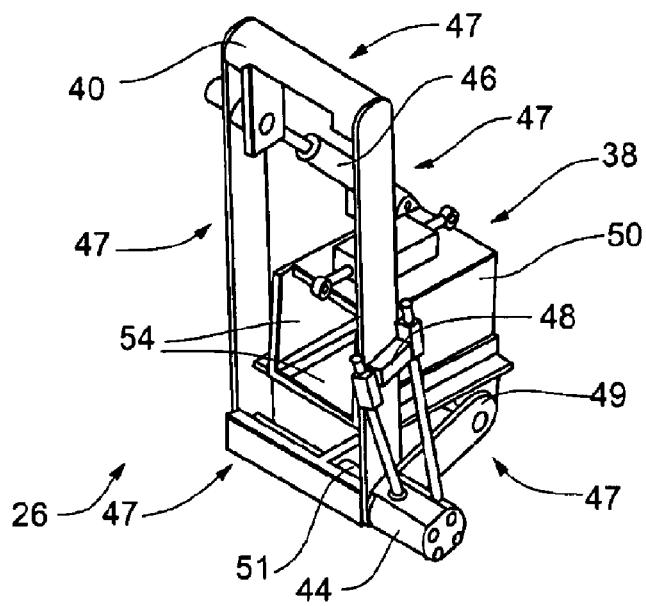
FIG. 7 is a perspective view of the trolley of FIG. 5.

Referring to FIGS. 5-7, trolley 24 has boom housing 38, arbor 40, arbor shaft 42, saw motor 44, hydraulic cylinder 46, and hydraulic check valve 48, in an exemplary embodiment. Generally, boom housing 38 is constructed around boom 22. Although boom housing 38 and boom 22 may have any number of shapes, boom housing 38 and boom 22 are substantially square in an exemplary embodiment, as depicted in FIGS. 3 and 5-7. Boom housing 38 fits snugly around boom 22 so that the interior surfaces of boom housing walls 50 are substantially coextensive with a portion of the exterior surfaces of boom walls 52. Boom housing 38 is thereby selectively positioned on and secured to boom 22. Since boom 22 and boom housing 38 are typically made of steel, boom housing walls 50 may be lined with a non-frictional material. In an exemplary embodiment, plates 54 made of a polymer such as perlon or nylon material are disposed or otherwise fixed to boom housing walls 38. In another embodiment, plates 54 are disposed or otherwise fixed to boom walls 52. Plates 54 facilitate the sliding of boom housing 38 along boom 22 by decreasing the friction between boom housing walls 50 and boom walls 52. Because boom housing 38 moves coextensively along boom 22, the distance boom housing 38 is able to travel is defined by the length of boom 22. Plates 54 can also be fitted loosely between boom housing walls 50 and boom walls 52. Such that plates 54 may be readily replaced when worn.

Figure 8:
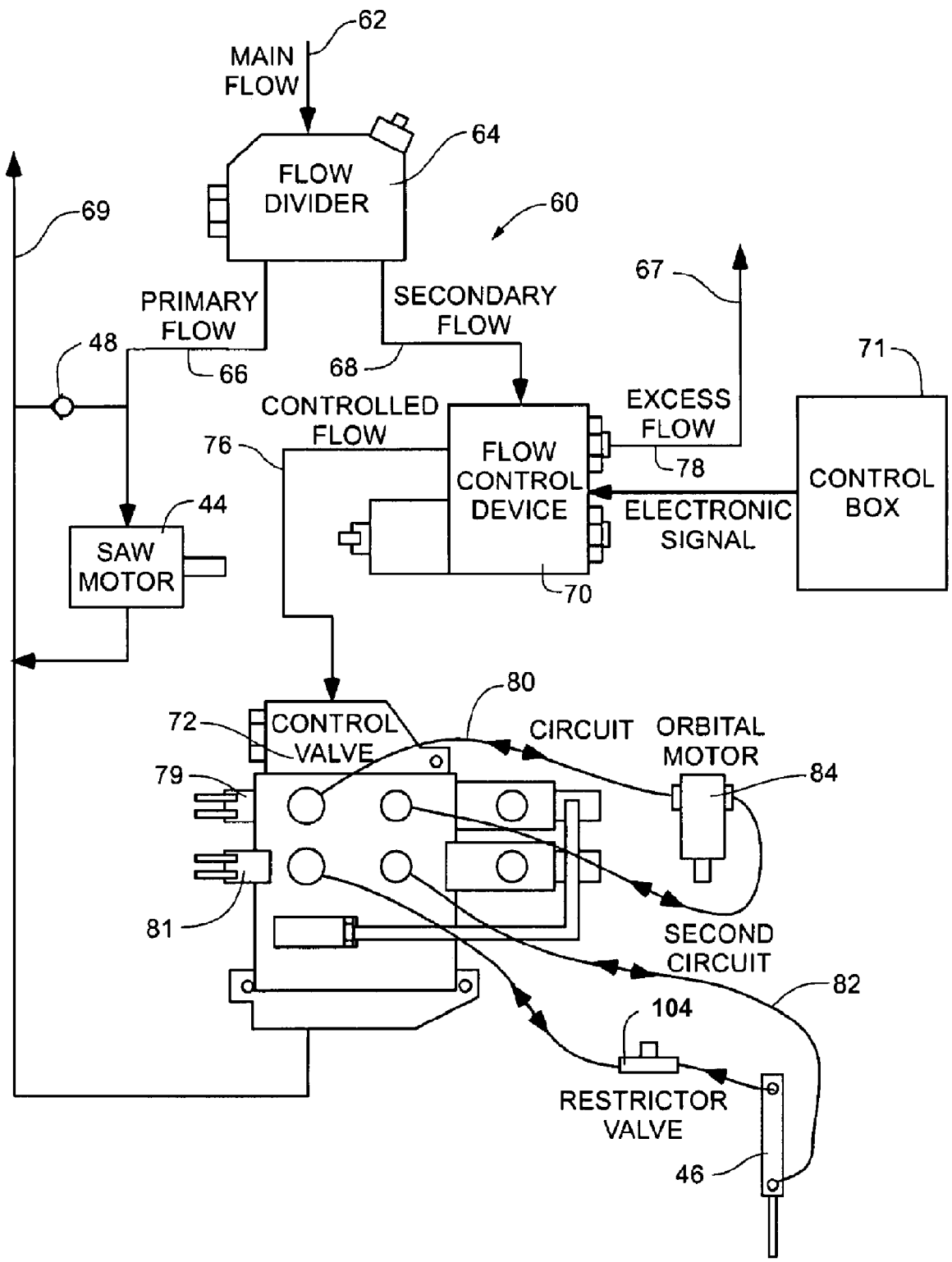
FIG. 8 is a schematic illustration of a hydraulic circuit for the cutting implement of FIG. 1 according to one illustrative embodiment.
Figure 12:
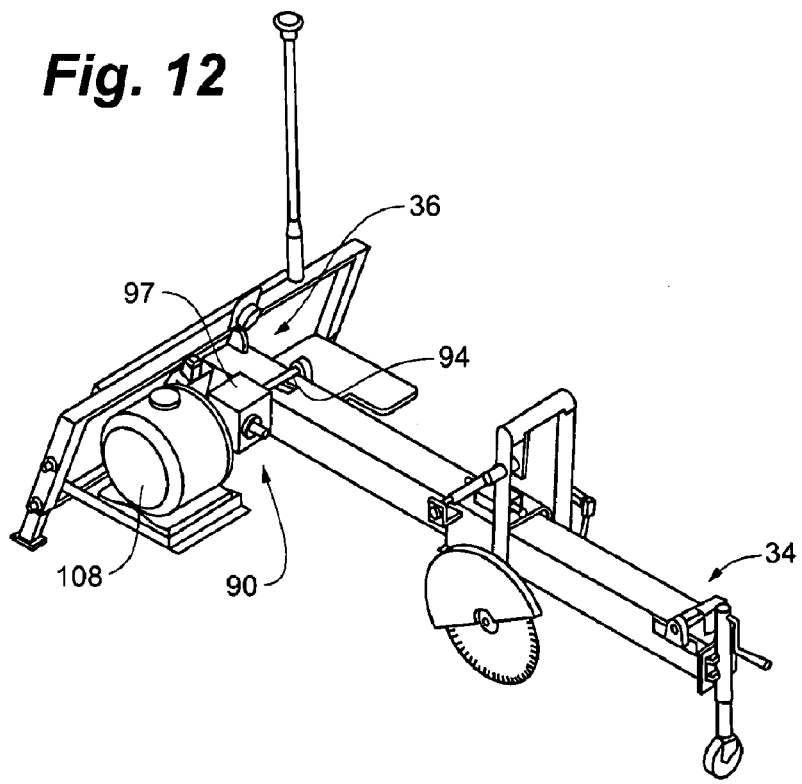
FIG. 12 is a perspective view of a cutting implement having a rotary saw having a gear reduction mechanism in which gear reduction motor is accomplished by a gear box according to one illustrative embodiment.
Figure 13:
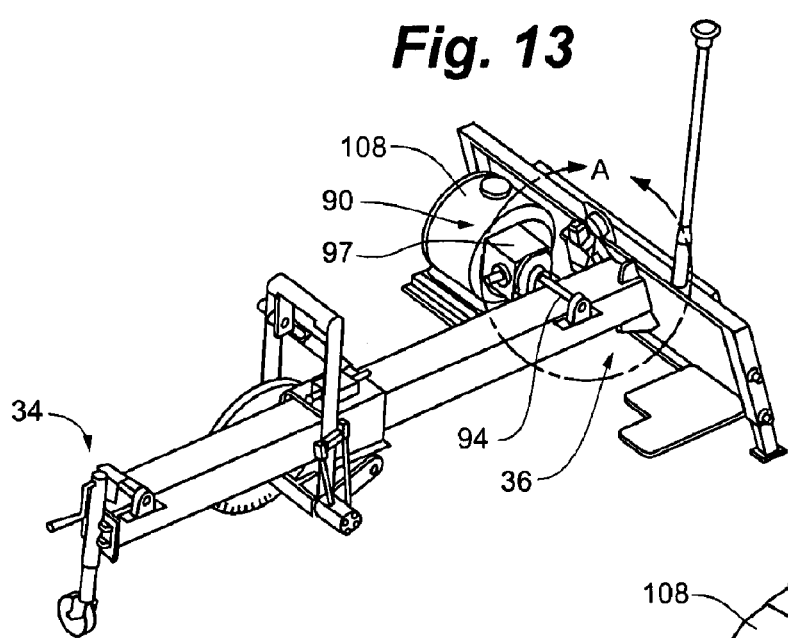
FIG. 13 is an additional perspective view of the cutting implement of FIG. 12.
Figure 14:
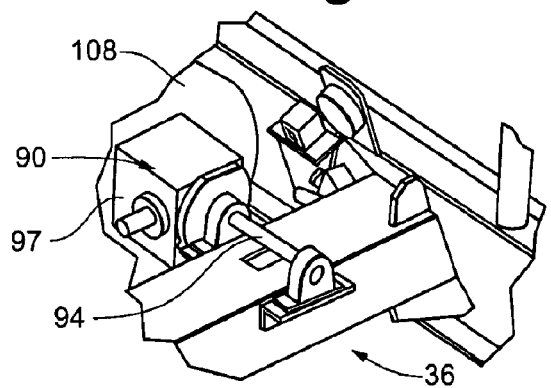
FIG. 14 is a partial perspective view of the cutting implement of FIG. 13, showing the gear reduction mechanism in more detail.

Cutting implement 20 is able to makes cuts in a paved surface by using hydraulic power from power machine 10 to power rotary saw 32 having blade 33. Referring to FIG. 8, a schematic illustration of hydraulic control system 60 shows the flow path of the hydraulic fluid used to power cutting implement 20 in an exemplary embodiment. Generally, hydraulic control system 60 supports and substantially maintains a flow rate in the range of about fifteen gallons per minute to about twenty-five gallons per minute. In an exemplary embodiment, hydraulic control system 60 supports and substantially maintains a flow rate in the range of about twenty gallons per minute. The various components of hydraulic control system 60 may be linked in any number of ways. In an exemplary embodiment, the various components of hydraulic system are linked with hydraulic hoses.

Generally, power machine 10 supplies hydraulic fluid to and receives expended or excessive hydraulic fluid from hydraulic control system 60. Referring to FIG. 8, hydraulic fluid flows from power machine 10 as main flow 62. Main flow 62 is directed into flow divider 64. In an exemplary embodiment, flow divider is a Prince model RD 575 constant volume priority divider.

Figure 3:
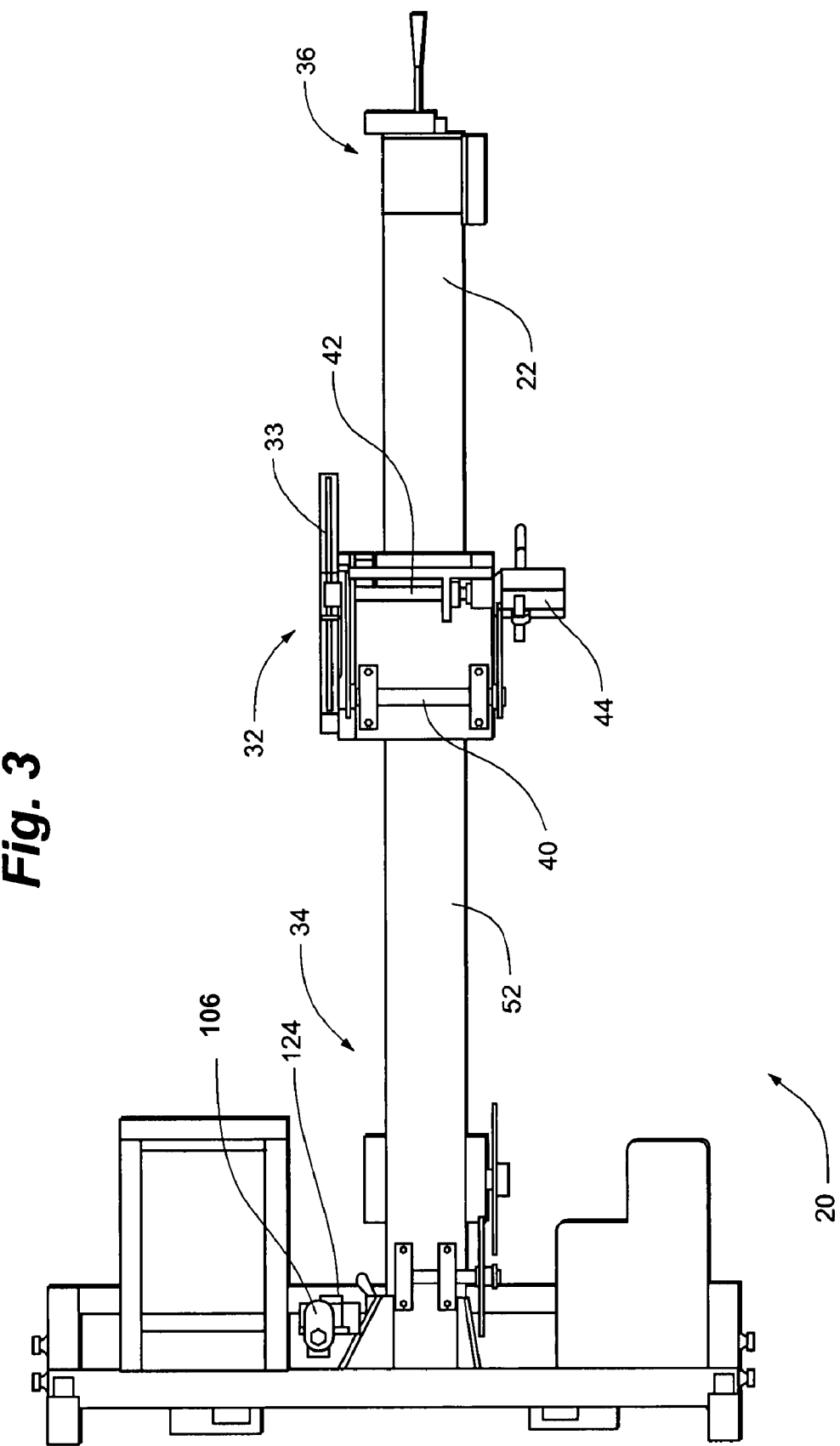
FIG. 3 is a top view of the cutting implement of FIG. 1.

Flow divider 64 divides hydraulic fluid into primary flow 66, which comprises most of direct flow 62, and secondary flow 68. Primary flow 66 is directed to saw motor 44 and returns to power machine 10 via return line 69. In an exemplary embodiment, saw motor 44 is a Parker gear motor. As primary flow 66 is directed through saw motor 44, saw motor 44 powers arbor shaft 42, which causes blade 33 to rotate, as depicted in FIG. 3. In an exemplary embodiment, hydraulic control system 60 supports and substantially maintains a flow rate sufficient to rotate blade 33 of rotary saw 32 at a rate of approximately 2,300-2,700 rotations per minute. Primary flow 66 may also route hydraulic flow through check valve 48. Check valve 48 allows blade 33 to gradually reduce rotational speed after hydraulic flow is cut off by an operator.

Secondary flow 68 is directed to flow control device 70. By selectively dividing secondary flow 68 into controlled flow 76 and excess flow 78, flow control device 70 permits adjustment of the rate of hydraulic flow through control valve 72 which, in turn, controls the output of orbital motor 84 and the rate of movement of hydraulic cylinder 46. Hydraulic flow which is not directed to control valve 72 is returned to skid-steer loader via return line 67 as excess flow 78. Flow control device 70 may be controlled manually, electronically, or by a load-sensing circuit. In an exemplary embodiment, flow control device 70 is a Brand Hydraulics model EC-12-01 electronic flow control controller. Flow control device 70 may be in electronic communication with control box 71. Although control box 71 may be located in any number of places on cutting implement 20 or power machine 10, control box 71 is generally mounted in cab 74 of power machine 10.

Flow control device 70 directs controlled flow 76 to control valve 72. Control valve 72 may contain any number of spools that divide controlled flow 76 into a corresponding number of circuits. By dividing controlled flow 76 into multiple circuits downstream of flow control device 70, control valve 72 provides a hydraulic configuration that permits multiple components of cutting implement 20 to be powered by a selectively variable rate of hydraulic flow. In an exemplary embodiment, control valve 72 is a Gresen V20 solenoid-controlled, dual-spool, closed center hydraulic control valve that divides controlled flow 76 into first and second circuits 80 and 82, respectively, although other control valves and valve arrangements may be used.

First circuit 80 and second circuit 82 provide a path for directing hydraulic flow to orbital motor 84 and hydraulic cylinder 46, respectively. As depicted in FIG. 8, first circuit 80 routes hydraulic flow to orbital motor 84 (which powers extension and retraction of boom housing 38 along boom 22) and second circuit 82 routes hydraulic fluid to hydraulic cylinder 46 (which controls the depth of the rotary saw blade 33). In an exemplary embodiment, orbital motor 84 is a Char-Lynn J-series hydraulic motor and hydraulic cylinder 46 is a Columbus Hydraulics double-acting cylinder.

A typical front-end loader similar to the power machine 10 depicted in FIG. 1 is capable of supplying hydraulic control system 60, in one embodiment, up to about twenty-six and one-half gallons of hydraulic fluid per minute. In an exemplary embodiment, first circuit 80 and second circuit 82 require a total of approximately six gallons of hydraulic fluid per minute. Therefore, hydraulic control system 60 is capable of providing up to about twenty and one-half gallons of hydraulic fluid available as the primary flow 66 for powering saw motor 44, saw motor 44 being the major consumer of hydraulic power on the cutting implement 20.

To achieve a proper allocation of hydraulic fluid between primary flow 66 and secondary flow 68, hydraulic fluid from power machine 10 is apportioned by flow divider 64. Generally, flow divider 64 is adjustable so that the flow rate of primary flow 66 and secondary flow 68 can be increased or decreased as desired. To allow the flow rate of primary flow 66 and secondary flow 68 to be adjusted, flow divider 64 may be a constant volume priority divider. In an exemplary embodiment, flow divider 64 supplies saw motor 44 with the majority of the hydraulic flow.

Referring to FIG. 8, primary flow 66 is directed to saw motor 44. To maximize the power and rotational speed of blade 33, saw motor 44 may be any number of motors having a capacity to displace substantially all of primary flow 66 while rotating blade 33 at a desired rate. In an embodiment, saw motor 44 has a displacement capacity of approximately 1.4 cubic inches to about 2.0 cubic inches. In an exemplary embodiment, saw motor 44 has a displacement capacity of approximately 1.7 cubic inches. The desired rotational speed of blade 33 may depend a number of factors, such as, for example, the material used to make the paving surface being cut by cutting implement 20, the state of hardness of the material, whether the material being cut is fully set or still curing, the type of blade 33 being used, and the diameter of blade 33. In an exemplary embodiment, saw motor 44 uses a hydraulic flow rate of approximate twenty gallons per minute to rotate blade 33 having a twenty-inch diameter at a rate of approximately 2,300-2,700 rotations per minute.

Figure 4:
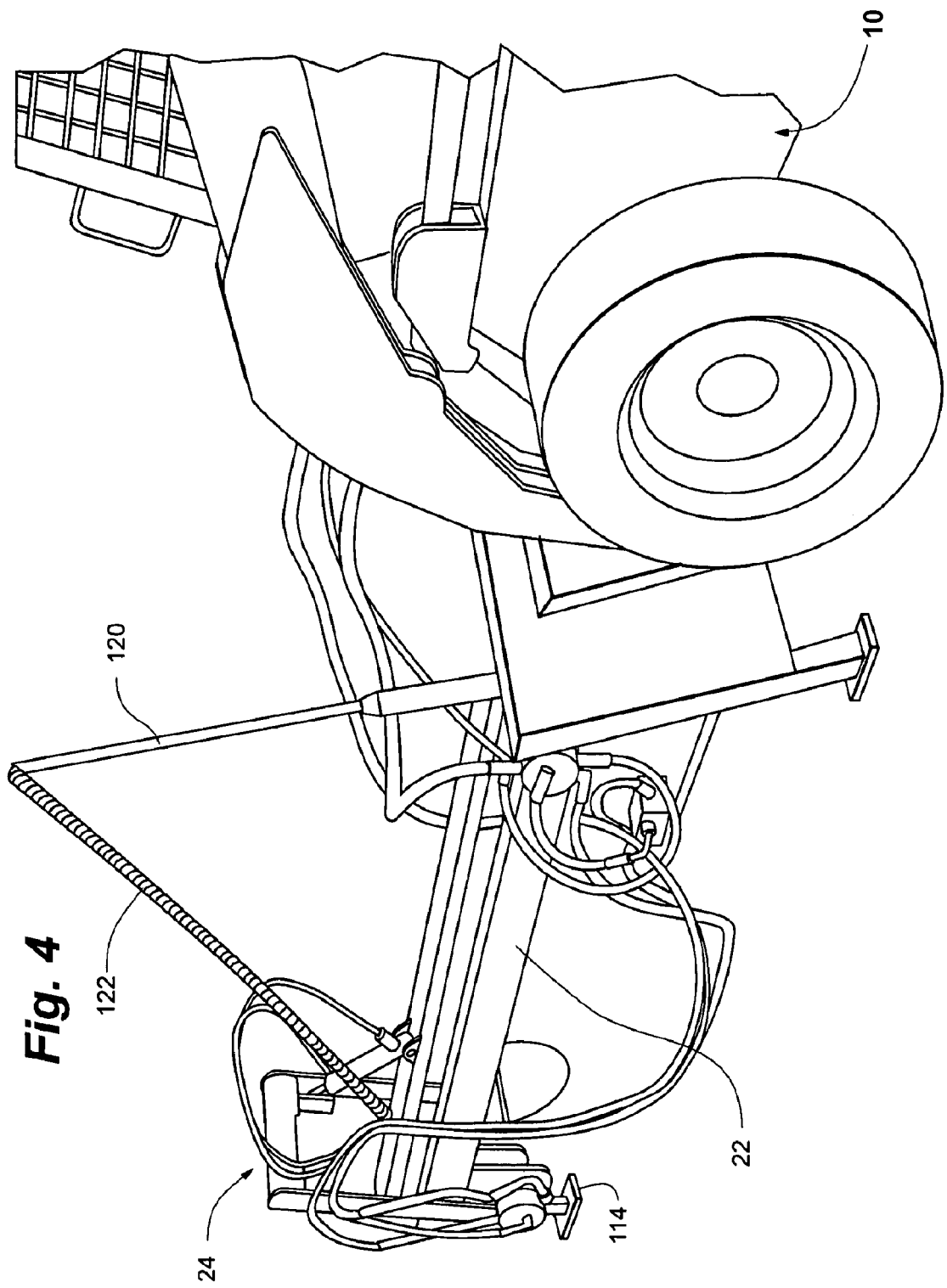
FIG. 4 is a rear perspective view of the implement of FIG. 1.

Referring to FIGS. 2-4, saw motor 44 rotates blade 33 by spinning arbor shaft 42 operably connected to saw motor 44 and blade 33. As arbor shaft 42 spins, arbor shaft 42 causes blade 33 to rotate. In an exemplary embodiment, arbor shaft 42 has a one-inch diameter and spins on flange bearings 45 in linkage system 47 attached to hydraulic cylinder 46. Linkage system 47 pivots on pillow block bearings 49 that can be adjusted so that blade 33 cuts parallel to boom 22.

To achieve a desired rotational rate of blade 33, saw motor 44 may be rotationally engaged to arbor shaft through any number of mechanisms. In an exemplary embodiment, flex coupler 51 couples saw motor 44 to arbor shaft 42. Flex coupler 44 produces a 1:1 gear ratio between saw motor 44 and arbor shaft 42. In another embodiment, arbor shaft 42 is driven by at least one belt, such as, for example, a single-cog belt or multiple-cog belts.

Depending upon the circumstances, such as the type of material used to make the paving surface being cut, it may be at times desirable to vary the rotational speed of blade 33. Alternatively, it may be desirable to select blades 33 having different diameters (which affects the speed at the cutting tip of blade 33) while maintaining a constant rotational speed. The rotational speed of rotary cutting blade 33 can be variably controlled in any number of ways. In an exemplary embodiment wherein arbor shaft 42 is gear-driven, rotational speed of blade 33 can be variably controlled by altering the displacement capacity or the gear ratio of saw motor 44, or both. Alternatively, saw motor 44 can be replaced with a different saw motor having a different displacement capacity, gear ratio, or both. In an embodiment of the present invention wherein blade 33 is belt-driven, the rotational speed of blade 33 can be variably controlled by changing the size of the pulleys mounted on saw motor 44 and arbor shaft 42. In another embodiment, flow divider 64 can be modified so as to reduce or increase the flow of hydraulic fluid through flow divider 64.

As depicted in FIG. 8, hydraulic fluid that is not directed to saw motor 44 as primary flow 66 can be directed to orbital motor 84 and hydraulic cylinder 46 as secondary flow 68. Orbital motor 84 controls the travel of trolley 24 along boom 22. Hydraulic cylinder 46 controls the depth of rotary saw 32 relative to boom 22 and the paved surface being cut.

In general, orbital motor 84 can retract or extend trolley 22 by engaging a chain-and-sprocket system connected to boom housing 38. Specifically, as secondary flow 68 is directed to orbital motor 84, orbital motor 84 drives a series of gears that cause chain 88 to pull boom housing 38 in either the extension or retraction directions. To achieve optimal performance of cutting implement 20, orbital motor 84 should provide sufficient output to retract trolley at a selected rate from distal end 34 to proximal end 36 while blade 33 cuts a paved surface. The orbital motor 84 may also be selected to extend trolley 24 from proximal end 36 to distal end 34 while blade 33 cuts a paved surface. In an embodiment, orbital motor 84 has an output of between about six-hundred and seven-hundred rotations per minute when supplied with about five gallons of hydraulic fluid per minute. In an exemplary embodiment, orbital motor 84 has an output of about six-hundred fifty-seven rotations per minute when supplied with about five gallons of hydraulic fluid per minute.

In operation, trolley 24 should maintain a relatively slow rate of travel of blade 33 through the paved surface being cut. Since orbital motor 84 may have an output of around six-hundred fifty-seven rotations per minute when supplied with around five gallons of hydraulic fluid per minute, a gear reduction is often required to reduce the rate of travel of trolley 24. The desired speed reduction can be achieved in any number of ways. Generally, cutting implement 20 comprises gear reduction system 90 to achieve a desired rate of travel of trolley 24. In an exemplary embodiment, cutting implement 20 uses a combination of gears to produce a gear reduction ratio of 42:1. Referring to FIGS. 9-10, first reduction gear 92 provides a primary reduction of 7:1. Second reduction gear 93 provides a secondary reduction of 6:1 and is connected to idler shaft 94. The total reduction from orbital motor 84 to idler shaft 94, therefore, is 42:1. To protect gear reduction system 90 from damage and the operator of cutter from harm, gear reduction system 90 may be covered with safety shield 96. In another embodiment, gear reduction can be achieved with a gear box 97. Use of gear box 97 in place of reduction gears 92, 93 may reduce the number of exposed moving parts, eliminate the need for a safety shield, and increase the durability of cutting implement 20. Use of gear box 97 may also simplify the process of assembling cutting implement 20 since orbital motor 84 can be attached directly to gear box 97.

Orbital motor 84 drives trolley 24 by powering gear reduction system 90 or gear box 97 that engages chain drive system 98. Referring to FIGS. 9-11, chain drive system 98 has an end of chain 88 attached to the top of each end of trolley 24. Chain 88 wraps around idler sprocket 100 located at distal end 34 of boom 22 and around drive sprocket 102 located at proximal end 36 of boom 22. Between the idler and drive sprockets 100, 102, chain 88 extends above boom 22 and drapes inside the interior cavity of boom 22. An adjustable tensioner can be attached to one end of chain 88 to limit the amount of drape under boom 22. To protect the operator of cutting implement 20 or other individuals, reduce the risk of interference with the chain drive system 98, and protect chain 88 from damage, the top of chain 88 may also be covered with a shield. Generally, chain 88 may be any type of linkage device suitable for use in cutter. In an exemplary embodiment, chain 88 is a heavy-roller chain.

In operation, orbital motor 84 engages chain drive system 98 in either the direction of extension or retraction, which causes chain 88 to pull trolley 24 in the selected direction. The direction in which chain 88 pulls trolley 24 is determined by the direction in which an output shaft from orbital motor 84 rotates, which is operator selectable. Trolley 24 moves as boom housing 38 slides along boom 22. Generally, the inside surfaces of boom housing walls 50 are coextensively positioned around boom 22 to minimize unintended wiggle of trolley 24. This helps establish a snug fit between boom housing 38 and boom 22 that can reduce the risk of blade 33 becoming immovably wedged in the paved surface during operation. Due to friction, however, this snug fit can also impede the movement of trolley 24 to along boom 22. To increase ability of trolley 24 to travel along boom housing 38 during operation while maintaining a snug fit, the inside surfaces of boom housing walls 50 or the outside surfaces of boom walls 52 can be lined with a material having a low coefficient of friction. The type of material and thickness of the material can be varied to accommodate limitations such as availability, cost, and durability.

In an exemplary embodiment, the inside surfaces of boom housing walls 50 are at least partially lined with plates 54 made from a polymer, such as perlon or nylon, having a thickness of approximately one-half inch. In another embodiment, the outside surfaces of boom walls 52 are at least partially lined with a polymer, such as perlon or nylon, having a thickness of approximately one-half inch. Plates 54 may be loosely disposed between boom housing walls 50 and boom walls 52 and captured in such disposition by inwardly directed flanges formed on boom housing walls 50. Plates 54 may be readily replaced in such disposition when worn. In another embodiment, both the inside surfaces of boom housing walls 50 and the outside surfaces of boom walls 52 are at least partially lined with a polymer, such as perlon nylon. In another embodiment, both the inside surfaces of boom housing walls 50 and the outside surfaces of boom walls 52 are at least partially lined with different materials.

An important feature and advantage of the present invention is the ability of hydraulic control system 60 of cutting implement 20 to be manipulated by an operator of power machine 10 to control the rate of retraction and extension of trolley 24 and the depth of blade 33 within the surface being cut. Referring to FIG. 8, control over the cutting rate and cutting depth is achieved by integrating flow control device 70 and control valve 72 into controlled flow 76. Generally, flow control device 70 controls the rate at which orbital motor 84 and hydraulic cylinder 46 can be operated, while control valve 72 controls how orbital motor 84 or hydraulic cylinder are operated. Specifically, flow control device 70 may be electronically linked to a controller, such as a manually-operated electronic flow controller or a load-sensing circuit. Depending upon the electronic information received from the electronic flow controller or load-sensing circuit, flow control device increases, decreases, or holds constant the rate of hydraulic flow. For example, when an increase in hydraulic flow is desired to increase the rate of extension or retraction or trolley 24 or the rate at which blade 33 is raised or lowered, flow control device 72 increases the volume of controlled flow 76 and decreases the volume of excess flow 78. Alternatively, when a decrease in hydraulic flow is desired to decrease the rate of extension or retraction or trolley 24 or that rate at which blade 33 is raised or lowered, flow control device 72 decreases the volume of controlled flow 76 and increases the volume of excess flow 78. In an exemplary embodiment, flow control device 70 is controlled by an electronic flow control device located in control box mounted in cab 74 of power machine 10. This allows an operator to manually adjust the speed of trolley 24 and hydraulic cylinder 46. In another embodiment, flow control device 70 is controlled by a load-sensing circuit. This allows the speed of trolley 24 and hydraulic cylinder 46 to be automatically adjusted by cutting implement 20 in response to changes in pressure or resistance as blade 33 effects a cut.

When this signal is adjusted, such as by manipulation of control box 71, a valve within flow control device 70 is opened or closed to port more or less hydraulic fluid to control valve 72, thereby increasing or decreasing the speed of trolley 24 or depth control (by movement of hydraulic cylinder 46) by a corresponding amount. In an embodiment of the present invention, the speed of trolley 24 can be adjusted between about zero feet per minute and about thirty feet per minute. In an exemplary embodiment, the speed of trolley 24 can be adjusted between about zero feet per minute and about fourteen feet per minute. This enables the trolley to be moved slowly during retraction (cutting) while maximizing trolley speed during extension (non-cutting/repositioning). Alternatively, fluid pressure gauge 103 located in primary flow 66 circuit can be used to set the speed of retraction of trolley 24 without departing from the spirit of scope of the present invention.

While flow control device 70 allows the rate of hydraulic flow to orbital motor 84 and hydraulic cylinder 46 to be selectively controlled, control valve 72 allows orbital motor 84 and hydraulic cylinder 46 to be selectively actuated. Generally, control valve 72 is electronically linked to existing controls in cab 74 of power machine 10. Specifically, the controls are able to relay electronic signals to control valve 72. These signals dictate which circuits 80, 82 should be actuated.

Control valve 72 may, therefore, be any type of valve having the ability to simultaneously control two or more hydraulic circuits. In an exemplary embodiment, control valve 72 is a closed-center, solenoid-controlled, dual-spool valve. Depending upon the electronic signal received from the controls, spool valves 79, 81 within control valve 72 may be shifted in a selected direction. The directions in which spool valves 79, 81 are shifted determine the direction of hydraulic flow through circuits 80, 82 which, in turn, determines the direction of trolley 24 and whether rotary saw 32 is raised or lowered. When spool valves 79, 81 are centered, hydraulic flow through the corresponding circuits 80, 82 and movement of the corresponding components are halted.

By manipulating the controls in cab 74 which are electronically linked to control valve 72, an operator is able to select which circuits 80, 82 receive hydraulic flow and adjust the direction of hydraulic flow through circuits 80, 82. Specifically, the direction of the hydraulic flow can be reversed by using the controls to change the orientation of spool valves 79. 81 is control valve 72. This allows an operator to extend and restrict trolley 24 and raise or lower rotary saw 32. Referring to FIG. 8, an operator may choose to actuate spool valve 79 of control valve 72 that actuates primary circuit 80. When primary circuit 80 is actuated, hydraulic flow powers orbital motor 84 and causes trolley 24 to extend or retract along boom 22. When the orientation of spool valve 79 within control valve 72 is changed, hydraulic flow through primary circuit 80 is reversed and the direction of trolley 24 changes. An operator is thereby able to both retract and extend trolley 24. When spool valve 79 of primary circuit 80 is centered, trolley 24 is halted at its current position.

An operator may also choose to actuate spool valve 81 of control valve 72 that actuates secondary circuit 82. When secondary circuit 82 is actuated, hydraulic flow powers hydraulic cylinder 46 and causes rotary saw 32 to be raised or lowered. By changing the orientation of spool valve 81 within control valve 72 an operator can reverse the hydraulic flow through secondary circuit 82, thereby raising or lowering rotary saw 32. When spool valve 81 of primary circuit 82 is centered, rotary saw 32 is held at a desired depth. Referring to FIG. 8, restrictor valve 104 may also be incorporated in second circuit 82 to control the rate at which hydraulic cylinder 46 lowers blade 33. In an exemplary embodiment, restrictor valve 104 can be adjusted to the desired flow rate in the downward direction, but does not affect the flow rate in the upward direction.

To permit an operator to judge the depth of blade 33 in the paved surface being cut, trolley 24 may also have a depth control gauge. Generally, depth control gauge may be any number of devices that visually, electronically, acoustically, or otherwise display the depth of blade 33 relative to boom 22 or the paved surface being cut. In an exemplary embodiment, cutting implement 20 has a color-coded gauge positioned parallel to hydraulic cylinder 46. As the depth of blade 33 is adjusted, a different color from a fixed spectrum of controls disposed to the color-coded gauge is mechanically covered or uncovered to indicate depth.

The hydraulic flow through first circuit 80 (responsible for trolley speed) and second circuit 82 (responsible for depth of blade 33) are typically adjusted by separate controls. Primary circuit 80 and secondary circuit 82 are also typically adjusted such that circuits 80, 82 are not simultaneously actuated. Cutting implement 20 may easily be configured, however, so that primary and secondary circuits 80, 82 are simultaneously controlled or controlled by a different system of controls. For example, first circuit 80 and second circuit 82 may be controlled the use of control box 71, such as controls hydraulic flow through flow control device 70. Alternatively, hydraulic flow in first circuit 80 or second circuit may be controlled through the use of a pressure sensor integrated into the controlled flow. In either of these embodiments, control box 71 and pressure sensor may be positioned in any number of locations, such as inside or outside of cab 74 of power machine 10 or on cutting implement 20.

Cutting implement 20 optionally includes a number of other features that may enhance or improve the operation of cutting implement 20. Referring to FIGS. 1-2, 4 and 9, cutting implement 20 may have spring-loaded mast 120. As depicted in FIG. 4, the hydraulic hoses of hydraulic control system 60 can be attached to spring 122 disposed to spring loaded mast 120. Alternatively, the hydraulic hoses of hydraulic control system 60 can be attached directly to spring-loaded mast 120. Although spring-loaded mast 120 may be positioned in a number of locations, spring-loaded mast 120 is generally disposed to attachment plate 28. By connecting the hydraulic hoses to spring 122 or spring-loaded mast 120, the likelihood of interference between trolley 24 or blade 33 and hydraulic hoses as boom housing 38 moves along boom 22 can be reduced.

In an exemplary embodiment, cutting implement 20 has spring-loaded mast 120 and spring 122. When trolley 24 is located in an extended position at distal end 34 of boom, the hydraulic hoses pull on spring 122 while spring 122, in turn, pulls on spring-loaded mast 120. These pulling forces cause spring 122 to expand and the top of spring-loaded mast 120 to bend from an upright position toward distal end 34 of boom 22. As trolley 24 is retracted from distal end 34 of boom 22 toward proximal end 36 of boom 22, spring 122 contracts and spring-loaded mast 120 returns to an upright position. These actions by spring 122 and spring-loaded mast 120 cause the hydraulic hoses to be dragged away from trolley 24, thereby removing the hydraulic hoses from the pathway of blade 33 and reducing the likelihood that the hydraulic hoses might interfere with trolley 24. In an embodiment, cutting implement 20 may also include a support bar (not shown) to which the hydraulic hoses can be movably attached. The support bar elevates the hydraulic hoses so that the hydraulic hoses do not rest on the surface being cut as trolley 24 travels along boom 22.

Cutting implement 20 may also include a component that facilitates alignment of cutting implement 20 with a desired cutting path, such as in cutting control joints in concrete. Referring to FIG. 3, cutting implement 20 may have a laser alignment system. The laser alignment system has a laser emitter 124 that emits a beam substantially aligned with the cutting path of blade 33. Laser emitter 124 may be disposed to boom 22, attachment plate 28, or other appropriate component of cutting implement 20. Laser light system can be used in a variety of situations, such as, for example, aligning a cutting pathway with existing control joints. When cutting implement 20 is used to create cut control joints, a laterally directed rod can also be attached to a side of boom 22. Based upon the chosen length of the rod, an operator can easily space control joints on a sidewalk at a desired interval by aligning the distal end of the rod with the previous cut.

To limit overheating of blade 33 during operation, cutting implement 20 can also be equipped with a coolant delivery system. Referring to FIGS. 2-3, the coolant delivery system generally has a pump 106, a tank 108, and at least one hose and one nozzle. In operation, pump 106 directs a coolant such as water coolant is drawn from tank 108 through a hose and sent to a nozzle. The nozzle is optimally positioned so as to spray coolant onto at least one side of blade 33. The coolant delivery system can also be configured so as to spray coolant onto both sides of blade 33 by positioning a nozzle on each side of blade 33. In an exemplary embodiment, a twelve-volt pump 106 supplies coolant from a water tank 108 to two water nozzles situated on opposite sides of blade 33. To allow an operator to control the amount of water delivered to blade 33, the coolant delivery system may also include an adjustable pressure regulator electrically connected to a control switch located in cab 74 of power machine 10. A small valve between pump 106 and the nozzles can also be used to control the amount and rate of coolant delivered to blade 33.

Similarly, cutting implement 20 may also be adapted to deliver a fluid to the paved surface being cut. In an exemplary embodiment, a spray nozzle is attached to cutting implement 20, such as rotary saw 32 of cutting implement 20, so that an operator can simultaneously apply a fluid to the paved surface while cutting the paved surface. The fluid may comprise a chemical that retards the rate at which concrete cures or some other suitable reagent, a solution, a solvent, a carrier, a surfactant, a dispersion, a dispersant, a mixture, and a lubricant.

Figure 15:
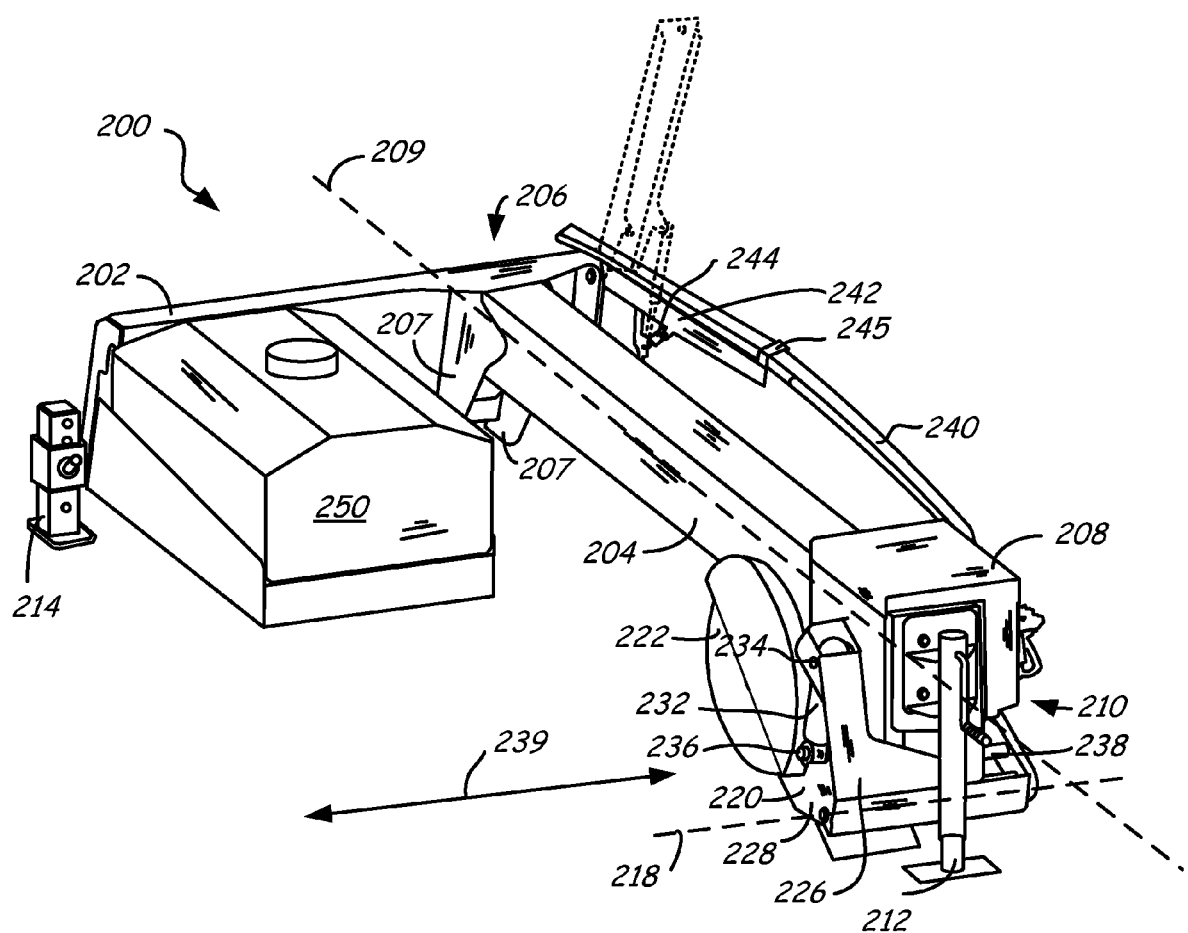
FIG. 15 is a perspective view of a cutting implement according to another illustrative embodiment.
Figure 16:
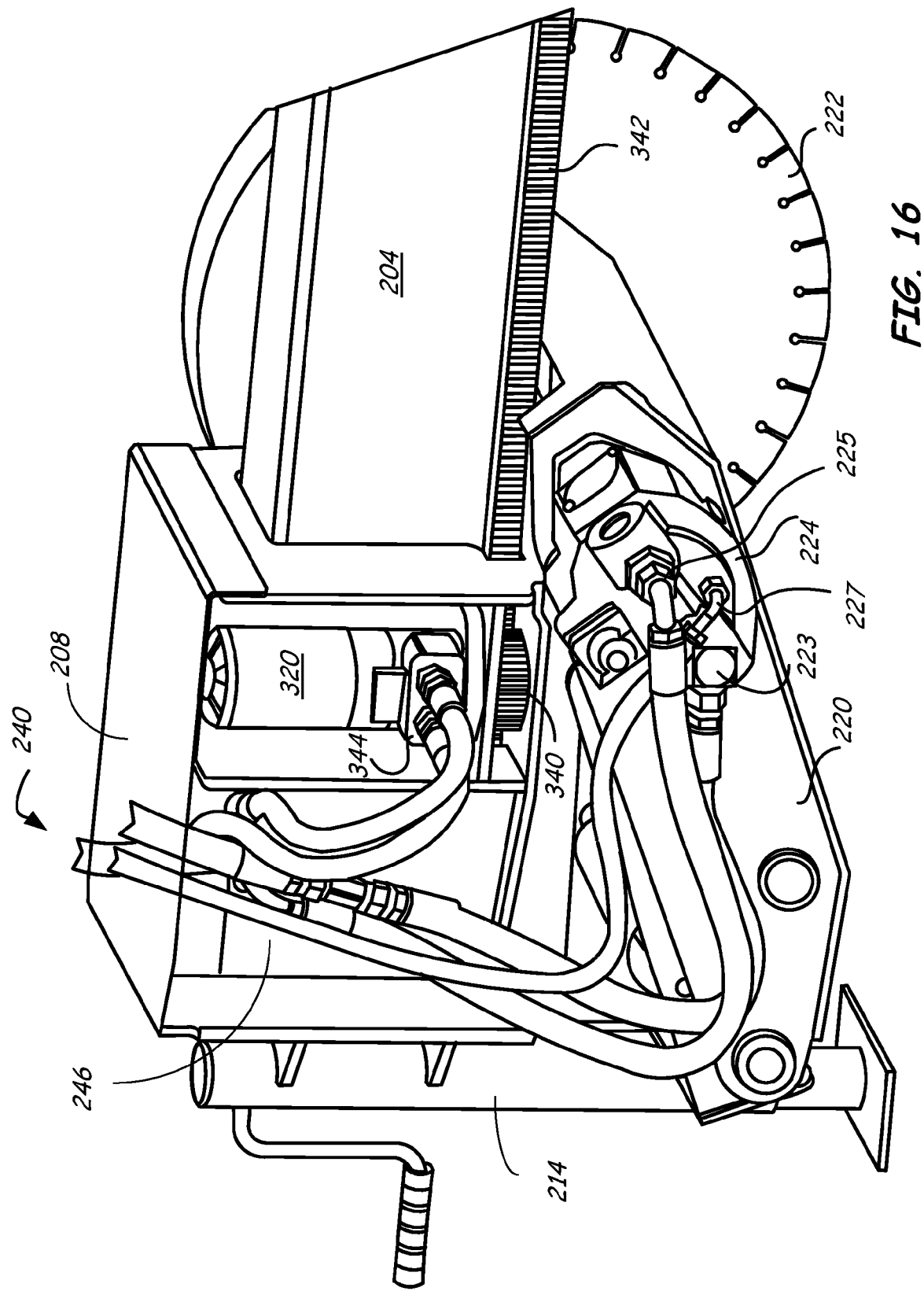
FIG. 16 is a view of a portion of the cutting implement of FIG. 15 from an opposing side of the implement.

FIGS. 15-16 illustrate a cutting implement 200 that is configured to be attached to a power machine such as power machine 10 according to another illustrative embodiment of the present disclosure. Cutting implement 200 includes an attachment structure 202, which is configured to be interfaced with, and secured to, an implement carrier on a power machine. The cutting implement 200 is configured to receive one or more power sources to control various functions on thereon. The power sources and how they are employed on the cutting implement 200 will be discussed in more detail below. A boom 204 extends from the attachment structure 202 in a generally perpendicular direction, although the boom 204 can extend from any angle with respect to the attachment structure 202 or any portion of the attachment structure 202 without departing from the scope of this disclosure. Boom 204 is illustratively fixedly secured to the attachment structure 202 at a proximal end 206 of the boom 204 such as by welding or by the use of fasteners so that it is generally incapable of rotating or moving laterally with respect to the attachment structure 202. In FIG. 15, the boom 204 is shown disposed between a pair of braces 207, which provide additional structural support. A trolley 208 is carried on the boom 204 and is capable of being moved under power along an axis 209 that extends through the boom 204 from the proximal end 206 of the boom 204 to a distal end 210. The boom 204 and trolley 208 can be made of similar materials as those discussed above in other embodiments.

An adjustable support structure 212 is attached to the distal end 210 of the boom 204 and includes a pair of adjustable support structures 214 (only one is shown in FIG. 15) that are laterally spaced apart and attached to the attachment structure 202. The adjustable support structures 212 and 214 are configured to be adjusted to engage a support surface such the ground or a paved surface to provide a three point interaction with the support surface during operation of the cutting implement 200. The trolley 208 is shown positioned near the distal end 210 of the boom 204, but as discussed above, the trolley 208 is configured to move under power along the boom 204 between the proximal end 206 and the distal end 210. An undercarriage 220 is attached to the trolley 208 along axis 218 and is capable of moving laterally with respect to the trolley 208 and thus, the boom 204. A cutting element 222, which in the illustrative embodiment is a circular blade, is rotatably coupled to the undercarriage 220 so that movement of the undercarriage 220 with respect to the trolley 208 causes the cutting element or blade 222 to be moved and positioned with respect to the trolley 208 and, by extension, the boom 204.

A cutting element actuator or blade actuator 224 is operably coupled to the cutting element or blade 222 to power the blade 222 in response to actuation signals from an operator. In the illustrated embodiment, the blade actuator 224 is a hydraulic motor with an output shaft (not shown in FIGS. 15 and 16) that is coupled to the blade 222, although other types of actuators such as electric motors can be employed as a blade actuator. The actuator 224, as shown in FIG. 16, is attached to the undercarriage 220 and an output shaft of the motor is aligned with a center of the blade 222 so that it directly drives the blade 222. Alternatively, the actuator 224 can be coupled to the blade via a gearing arrangement or other similar arrangement such as a belt and pulley arrangement, with a gear ratio selected to provide advantageous speed and torque levels. In one embodiment, the blade actuator 224 is a variable displacement hydraulic motor. Alternatively, the blade actuator 224 is a fixed displacement hydraulic motor. The blade actuator 224 includes an inlet 223, an outlet 225, and a case drain 227, all of which are coupled to hydraulic conduits to provide and remove hydraulic fluid from the blade actuator 224.

The undercarriage 220 includes a first portion 226, which includes a generally vertically extending bracket and a second portion 228, which includes a tray that is pivotally coupled to the first portion along axis 218. The blade 222 is illustratively coupled to the second portion or tray 228 and a tilt actuator 232 is rotatably coupled to each of the first portion 226 and the second portion 228 at connection points 234 and 236, respectively. Actuation of the tilt actuator 232, which is illustratively a hydraulic cylinder, causes the second portion 228 of the undercarriage to rotate with respect to the first portion 226, thereby raising and lowering the blade 222 with respect to the boom 204.

The undercarriage 220 is coupled to the trolley 208 via a side shift actuator 238, in this embodiment a two-way hydraulic actuator, which is positioned so that the rods extend in a plane that is generally perpendicular to a plane that extends through the boom 204. Extension of the cylinder in one or the other direction causes the undercarriage 220, including blade 222 to shift in a lateral direction generally indicated by arrow 239. Thus, blade 220 is capable of shifting in a lateral direction while the boom 204 itself is fixedly attached to the attachment structure 202.

Power conduits 240 extend from near the proximal end 206 of the boom 204 to the trolley 208. Power conduits 240 are shown as a bundle in FIG. 15 for illustrative purposes, but need not be bundled as shown. A conduit guide 242 is pivotally mounted to the attachment structure 202 and the power conduits 240 are secured to or otherwise contained adjacent the conduit guide 242 such as by being routed through a catch 245, which is configured to contain the power conduits 240 proximal to the conduit guide 242. A tensioning mechanism 244, which in the illustrated embodiment shown in FIG. 15 is a gas spring, acts against the conduit guide 242 to urge the conduit guide 242 to pivot in a generally vertical direction. When the conduit guide 242 is pivoted in a generally vertical direction, shown in phantom in FIG. 15, the power conduits 240 are generally held up away from a support surface. This advantageously reduces the likelihood that power conduits 240 would be in contact with a support surface and damaged due to frictional wear that may occur such as during transportation of the cutting implement 200 during travel, especially when the trolley 208 is positioned toward a proximal end 206 of the boom 204. As the trolley 208 moves toward a distal end 210 of the boom 204 as is shown in FIG. 15, the force applied on the conduit guide 242 by the power conduits 240 counteracts the tensioning mechanism 244, causing the conduit guide 242 to pivot toward a more horizontal attitude, allowing the power conduits to extend along a lower trajectory to account for an increased distance of the trolley 208 from the proximal end 206 of the boom 204 while continuing to hold the power conduits 240 away from the support surface.

In one illustrative embodiment, the power conduits 240 include hydraulic conduits that are configured to be attached to hydraulic couplers (not shown) on the power machine 10 on one end and a hydraulic component mounted on the trolley 208 on the other end. In the illustrative embodiment, some of the power conduits 240 are attached directly to actuator 224, although in other embodiments, they may be coupled to a valve assembly 246 that is mounted on the trolley, which in turn ports hydraulic fluid to other hydraulic components that are mounted to the trolley 208, including, for example, the blade actuator 224 as will be discussed in embodiments below. In the embodiment illustrated in FIG. 16, the outlet 225 is in communication with the valve assembly 246 to provide hydraulic fluid to the valve assembly 246, which in turn can be provided to other hydraulic elements on the cutting implement 200. One example of such an element is a trolley motor 320 that is shown attached to the trolley 208. The trolley motor 320 is in communication with the valve assembly 246 via ports 334 for the purposes of receiving hydraulic fluid to cause the trolley motor 320 to move. A gear 340 is coupled to an output shaft (not shown in FIG. 16) of the trolley motor. The gear 340 is aligned with rack 342 on the boom 204. Rotation of the trolley motor 320 causes the gear 340 to engage the rack 342 and move the trolley 208 between the proximal and distal ends of the boom 204.

The power conduits 240 also include, in some embodiments, electrical conduits that supply electrical power to electrical components mounted on the trolley 208. In some embodiments, electrical conduits can include signal lines that supply communication signals between electronic devices on the power machine 10 and an electronic device (not shown in FIGS. 15 and 16) mounted on the trolley 208.

A reservoir 250 is illustratively secured to the cutting implement 200 proximal to the attachment plate 202. The reservoir 250 is provided to hold a coolant and/or lubricative fluid that is intended to be selectively provided to cool and/or lubricate the blade 222 and/or a portion of the surface that is being cut. In some embodiments, a pump (not shown in FIGS. 15 and 16) is mounted in, to, or near the reservoir 250 to draw fluid out of the reservoir 250 and pressurize the fluid. In some embodiments, the power conduits 240 includes a fluid conduit, which provides pressurized fluid to the trolley 208 for selective application to the blade 222 or the cut surface. The pump, in some embodiments, is an electric motor, which receives actuation signals from the power machine 10 or from an electronic device mounted on the trolley 208. In embodiments where the pump receives actuation signals from the electronic device mounted on the trolley 208, the power conduits 240 also includes one or more electrical conduits for providing said actuation signals. Alternatively, a reservoir and pump (not shown) can be mounted on the power machine 10, in which case, the power conduits 240 can still include a fluid conduit that provides a path for pressurized fluid from the reservoir on power machine 10.

Figure 17:
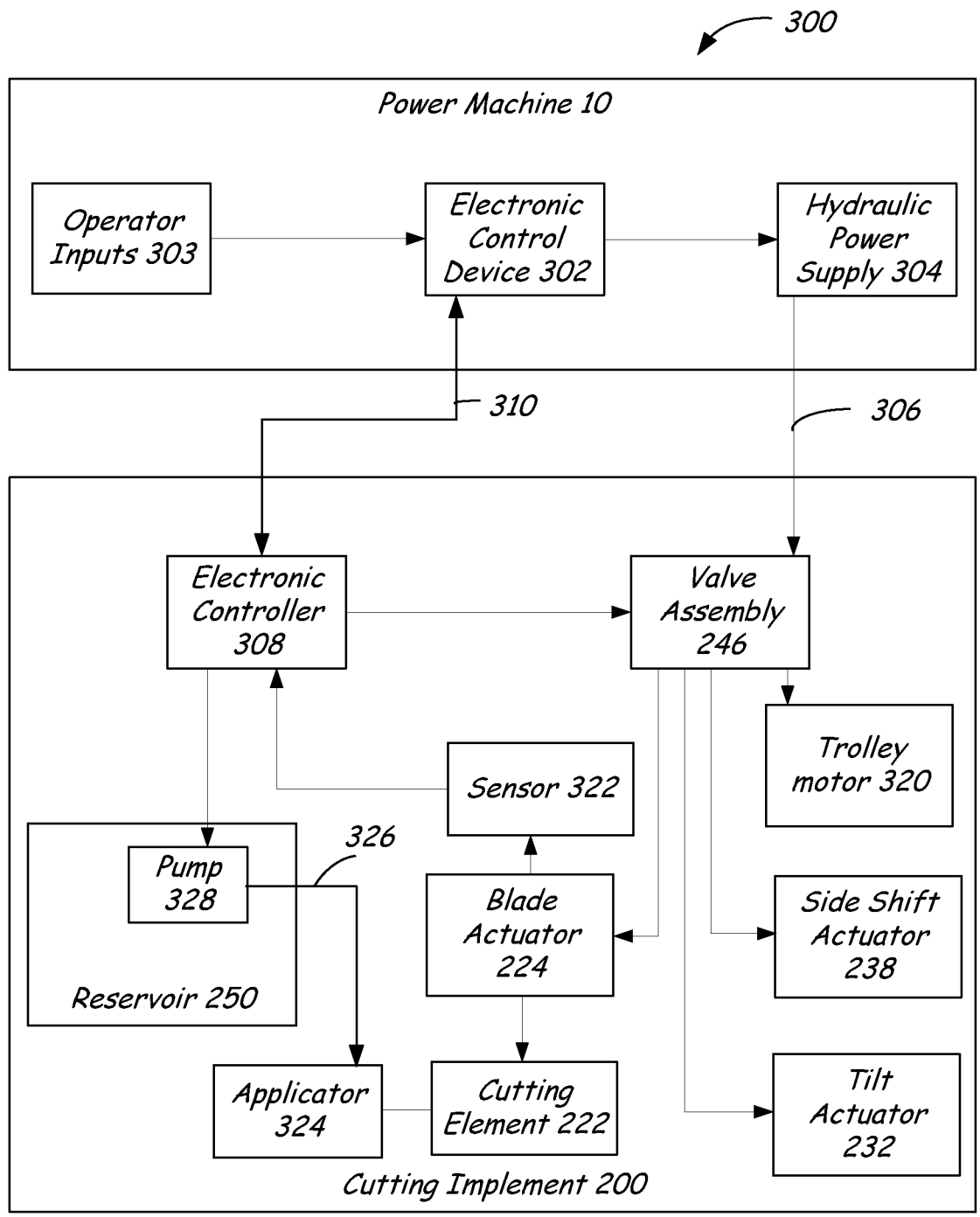
FIG. 17 is a schematic diagram of an electro-hydraulic control system of the cutting implement of FIG. 15, including power sources provided by a power machine, according to one illustrative embodiment.

FIG. 17 is a schematic illustrating an electro-hydraulic system 300 of the cutting implement 200 and interaction between the electro-hydraulic system 300 and various components on the power machine 10 when the cutting implement is attached to the power machine 10, according to one illustrative embodiment. Some of the components of the illustrative electro-hydraulic system 300 have been discussed above and in those instances, identical reference numbers are used to identify such components. In one embodiment, power machine 10 has an electronic control device 302 that is operably coupled to a plurality of operator inputs 303 that can be manipulated or actuated by an operator. It should be appreciated that any number of operator inputs such as switches, sliders, buttons, variable input devices, display devices can be coupled to the electronic control device 302 to provide operator inputs to provide inputs for controlling the power machine or request information from the electronic control device 302 and the like. It should also be appreciated that while the operable inputs 303 are shown in FIG. 17 as being located on the power machine 10, in alternate embodiments, the operator inputs can be located on any device capable of communicating indications of operator input actuations to the cutting implement 200. For the purposes of this discussion, actuable operator inputs 303 refers to input devices actuable to control functions related to the cutting implement 200. The electronic control device 302 illustratively provides control signals to a hydraulic power source 304, which, in turn, is capable of providing hydraulic fluid to hydraulic components on the cutting implement 200 via hydraulic conduits 306 when the cutting implement 200 is attached to the power machine 10. In addition, the electronic control device 302 is in electrical communication with an electronic controller 308 via electrical conduits 310 to send and receive signals to and from the electronic controller 308. In addition, the electrical conduits 310 provide a power signal to the electronic controller 308, either directly from the electronic control device 302 or via some other electrical source on the power machine 10. In one embodiment, the electrical signals between the electronic control device 302 and the electronic controller 308 are serial communication signals, such as those that conform to a controller area network (CAN) protocol, but any serial communication signals can be used. Alternatively, any suitable communication scheme can be used, whether the communication scheme be wired or wireless.

The electronic controller 308 is illustratively in electrical communication with valve assembly 246 to provide control signals to operate the valve assembly 246. The valve assembly 246 is, in turn, in communication with other hydraulic components on the cutting implement 200, some embodiments of which are described in more detail below, to provide hydraulic fluid to the components as desired. In one embodiment, the valve assembly 246 includes a plurality of electrically actuated spool valves, although other types of actuation devices can be employed to provide desired hydraulic fluid to hydraulic components on the cutting implement 200. The tilt actuator 232, the side shift actuator 238, and the trolley motor 320 are illustratively shown as being in communication with the valve assembly 246 such that the position of spool valves controls whether and how hydraulic fluid is provided to the tilt actuator 232, the side shift actuator 238, and the trolley motor 320. The blade actuator 224 is illustratively shown as also being in communication with hydraulic conduits 306. In the embodiment illustrated in FIG. 17, the blade actuator 224 is not controlled through the valve assembly 224. In some embodiments, separate pressurized hydraulic fluid is provided to the valve assembly 246 than is provided to the blade actuator 224 as is indicated in FIG. 17. Alternatively, hydraulic fluid is provided in series to the blade actuator 224 and then to the valve assembly 246, as is shown in FIG. 16. In further embodiments, discussed below, alternative arrangements the hydraulic system for the cutting implement are discussed.

A speed sensor 322 is positioned proximal to the blade 222 and is in communication with the electronic controller 308. The speed sensor 322 is configured to provide a signal indicative of the rotational speed of the blade 222. An applicator 324 is positioned near the blade 222 and is coupled to a fluid conduit 326, which is also in communication with pump 328. The applicator 324, in one embodiment is a nozzle that directs the flow of coolant onto the blade 222 or cutting surface. Pump 328 is in electrical communication with electronic controller 308, through which the pump 328 is configured to receive a signal to control when the pump 328 should be activated to pump fluid through fluid conduit 326.

Figure 18:
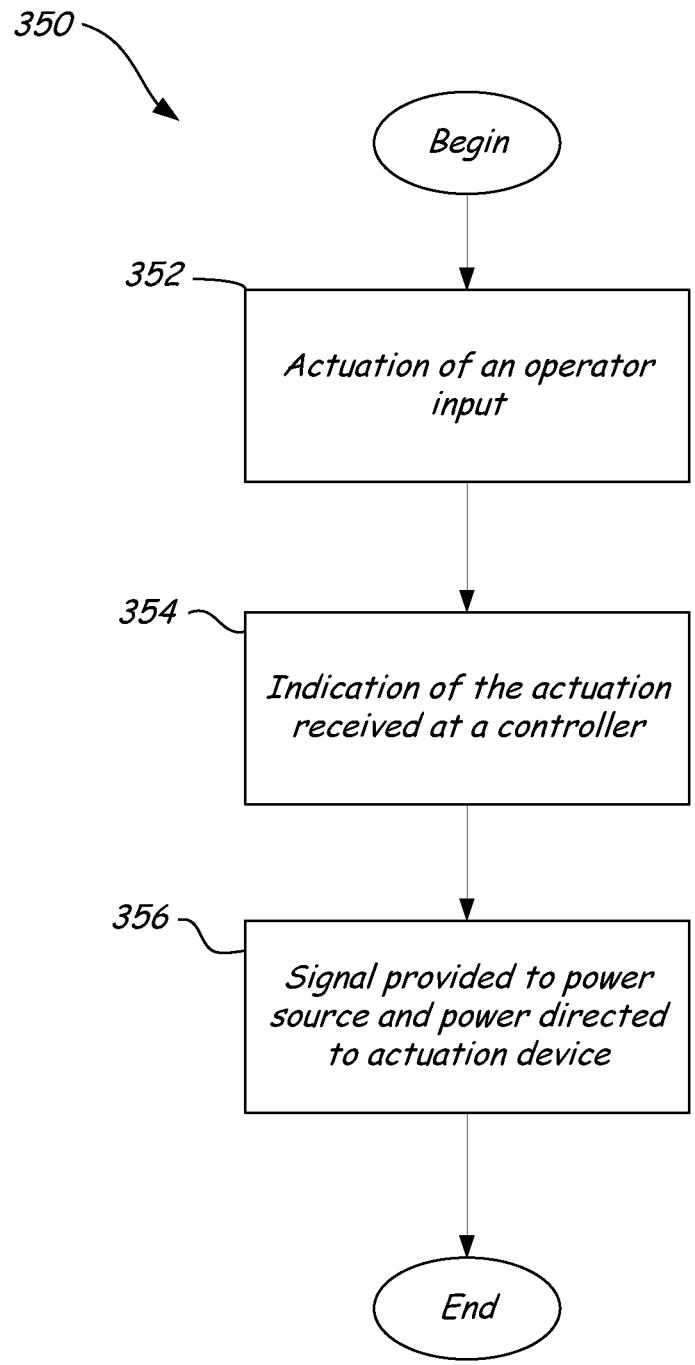
FIG. 18 is a flowchart illustrating a method of controlling a function on the cutting implement of FIG. 15 in response to an operator input, according to one illustrative embodiment.

FIG. 18 is a flow chart generally illustrating a method 350 of controlling actuation devices on the cutting implement 200, according to one illustrative embodiment. At block 352, an operator actuates an actuable operator input, thereby providing an indication of an intention to operate a function associated with the cutting implement 200. The actuated operator input is, in one embodiment, one of the operator inputs 303 discussed above. Alternatively, it can be any sort of actuable input, either on board a power machine, remote to the power machine but connected to the power machine, or any other actuable device, wired or wireless that can receive an input from an operator and transmit an indication of the input.

At block 354, an indication of the one or more actuations is provided to an electronic controller. The electronic controller can be resident on the cutting implement 200 (for example, electronic controller 308). Alternatively, the controller can be resident on the power machine 10 (for example, electronic control device 302). In other embodiments, the electronic controller can be resident in a hand held device, or any other device. At block 356, the electronic controller 308 controls actuation of power sources to the cutting implement 200 and directs the power sources on the cutting implement 200 in response to the indication. The electronic controller 308 may receive the indication directly from the operator input devices via, for example, a CAN communication bus. Alternatively, the electronic controller 308 can receive the indication from another controller.

A number of different actuation devices can be controlled on the cutting implement using the method illustrated in FIG. 18. A first example of an actuation device that can be controlled is the blade actuator 224. Various operator inputs can be actuated to operate the blade actuator 224 in various different ways. As one example, in certain instances, it may be desirable to operate the blade 222 at a constant rate continuously. If the indication provided is indicative of the desire to operate the blade 222 thusly, reception of that indication at electronic controller 308 will cause the electronic controller 308 direct a given flow of hydraulic fluid to the blade actuator 224. This can be accomplished by providing a signal to the electronic control device 302 to provide a control signal to the hydraulic power source 304 so that the hydraulic power source 304 provides a constant flow to the blade actuator. The flow may be adjusted, in some embodiments, in response to an indication of the speed of the blade 222, provided by speed sensor 322.

As another example, an operator may wish to adjust the rate at which the blade 222 is operated. One indication to the electronic controller 308 may signal a desire to speed up the blade 222, and another may signal a desire to slow down the blade 222. In either instance, the controller 308 may, in some embodiments, request a change in the flow from the power machine 10. Alternatively, the electronic controller may signal to the blade actuator 224 to adjust its displacement. Any adjustment to the rate at which blade 222 is operated can, in some embodiments, be stored in a memory device such as on electronic controller 308 so that when the blade 222 is actuated in the future, the adjusted rate is provided. Alternatively, the adjustment can be a momentary adjustment that is not stored for later use.

In some another examples of method 350, control of the tilt actuator 232, the side shift actuator 238, and the trolley motor 320 are all similarly controlled. Indications of an intention to actuate of any one of these actuators or motors are provided to the controller 308, which then controls the function thereof by requesting hydraulic flow and subsequently providing that flow, such as through valve assembly 246, to the appropriate actuator.

Method 350 can also be employed to control the application of a fluid to an external surface of the blade 222 or a cutting area, which can include the external surface of the blade 222 and/or a portion of the material being cut. As discussed above, it can be advantageous to apply a fluid to the blade 222 during cutting. One potential advantage to be gained by applying fluid is to reduce the temperature of the blade. Other potential advantages include providing lubrication and retarding the curing rate of a pavement material that is to be cut. One method of applying fluid into the cutting area includes receiving an operator input that indicates an intention to supply the fluid at an electronic controller. Based on that indication, the pump 328 is energized to provide the fluid to the cutting area. A second operator input related to providing fluid would then be interpreted as an intention to cease providing fluid to the blade 222.

In some embodiments, providing fluid to the blade 222 is provided according to one of a plurality of modes. A first mode, described above, is a continuous mode, that is, fluid is applied to the blade 222 continuously from the point when the indication is received signaling an intention to provide fluid until the indication is received to cease providing fluid. Alternatively other modes can be selected to control the proving of fluid to the blade 222 or the cutting surface. For example, it may be advantageous to limit the application of fluid to only when the blade actuator 224 is driving the blade 222 and, in some embodiments, for a period of time thereafter. As another example, it may be advantageous to further limit the application of fluid to only those times when the blade actuator 224 is driving the blade 222 and the tilt actuator 232 is energized to lower the blade 222 into a cut and, in some embodiments, for a period of time thereafter. As yet another example, it may be advantageous to limit the providing of fluid to those times when the drive actuator and the blade are engaged. As still another example, it may be advantageous to limit the application of fluid to only those periods of time when an indication of an operator input is present. In still another example, the application of fluid can be dependent on the measured rotational speed of the blade 222. These are but a few of the possible modes that can be used to control the flow of fluid to the blade 222 and/or the cutting surface. In one embodiment, a desired mode is selected from the plurality of available modes by an indication of an operator input. The desired mode is then stored in a memory on a controller such as electronic controller 308 or electronic control device 302 and the selected mode is remembered for future use. Alternatively, the desired mode is selected from the plurality of available modes through actuation of operator inputs at the time of use each time that an operator desires to provide fluid to the blade 222 and/or the cutting surface.

The embodiments above provide several advantages. A cutting implement is disclosed that includes a trolley, which carries a cutting element for cutting surfaces such as concrete, asphalt, or other similar surfaces. The cutting implement includes a boom that is rigidly mounted to an attachment structure to provide for increased support during the cutting operation. An undercarriage is mounted to the trolley and is movable with respect to the trolley so that the cutting element can be raised and lowered under power as well as being shifted from side to side under power. This allows for improved capability to position the cutting element without having to adjust the position of the power machine. A fluid providing system is also provided which allows for application of a coolant, lubrication, or other type of fluid to the cutting element and/or the cutting surface. The fluid providing system can be controlled to provide fluid according to a selected mode of application, selected from a plurality of favorable modes.

The embodiments above are intended to be illustrative and not limiting. Additional embodiments are within the claims. Although the present invention has been described with reference to particular embodiments, workers skilled in the art will recognize that changes may be made in form and detail without departing from the spirit and scope of the present invention.

What is claimed:

1. A cutting implement configured to be attached to an implement carrier of a power machine, comprising:
    an attachment structure, capable of engaging and being secured to the implement carrier;
    a boom having a distal end and a proximal end, the proximal end being rigidly attached to the attachment structure so that the boom is incapable of rotational and lateral movement with respect to the attachment structure;
    a trolley being carried on the boom and selectively positionable between the proximal end and the distal end of the boom; and an undercarriage operably coupled to the trolley, the undercarriage having a cutting element attached thereto and laterally offset from the boom, wherein the undercarriage is moveable under power in a lateral direction with respect to the trolley so that the cutting element is capable of being further offset along the lateral direction with respect to the boom on which the trolley is carried.

2. The cutting implement of claim 1, wherein the undercarriage further comprises:
    a first portion; and
    a second portion, pivotally attached to the first portion, wherein the cutting element is attached to the second portion.

3. The cutting implement of claim 2 and further comprising:
    a tilt actuator, pivotally coupled to the first portion and the second portion of the undercarriage, wherein actuation of the tilt actuator causes the cutting element to move in an arcuate, but generally vertical direction with respect to the trolley.

4. The cutting implement of claim 1 and further comprising a side shift actuator attached to the undercarriage for shifting the undercarriage in a lateral direction with respect to the trolley.

5. The cutting implement of claim 4, wherein the side shift actuator is a two-way hydraulic cylinder.

6. The cutting implement of claim 1 and further comprising:
    a fluid source capable of applying a fluid under power to a cutting area.

7. The cutting implement of claim 6, wherein the fluid is applied according to one of a plurality of operating modes selectable by an operator.

8. The cutting implement of claim 7 and further comprising a control system configured to be in electrical communication with the power machine and the fluid source and wherein the control system selects one of the plurality of operating modes based on signals received via electrical communication with the power machine.

9. The cutting implement of claim 7, wherein one of the plurality of operating modes causes the fluid to be applied to the cutting element based on whether the tilt actuator is actuated.

10. The cutting implement of claim 1 and further comprising a hydraulic actuator operably coupled to the cutting element.

11. The cutting implement of claim 10, wherein the hydraulic actuator is a variable displacement hydraulic motor.

12. The cutting implement of claim 11 and further comprising a speed sensor capable of measuring a rotational speed of the cutting element and providing a signal indicative of the rotational speed.

13. The cutting implement of claim 12, wherein the displacement of the hydraulic motor is capable of being varied based on the signal provided by the speed sensor.

14. The cutting implement of claim 11, wherein the displacement of the hydraulic motor is capable of being varied based on a signal indicative of an operator action.

15. The cutting implement of claim 1, wherein the boom includes a track extending in between the proximal and distal ends thereof, the track including a plurality of evenly spaced teeth thereon and further comprising:
    a travel motor operably coupled to the trolley having an output shaft with an engagement mechanism for engaging the teeth on the track for moving the trolley with respect to the boom.

16. A method of cutting a pavement material, comprising:
    providing a cutting implement that is attachable to a power machine through an attachment structure, the cutting implement having a boom, rigidly attached to the attachment structure so that the boom is incapable of rotational and lateral movement with respect to the attachment structure, that extends generally distally from the power machine and a trolley capable of moving along the boom under power;
    actuating at least one operator input in electrical communication with an electronic controller to cause an undercarriage attached to the trolley and having a cutting element coupled thereto and rotatable about an axis that is generally perpendicular to the trolley to move in a lateral direction with respect to the trolley.

17. The method of claim 16 and further comprising providing a cutting implement that is capable of receiving a signal communicative of an intention to cause the cutting implement to rotate under power.

18. The method of claim 16 and further comprising providing a cutting implement that is capable of receiving a signal communicative of an intention to change the rate at which the cutting element rotates under power.

19. The method of claim 16 and further comprising providing a cutting implement that is capable of receiving a signal communicative of an intention to cause the trolley to move along the boom.

* * * * *